(12) United States Patent
Ogawa et al.

(10) Patent No.: US 7,845,662 B2
(45) Date of Patent: Dec. 7, 2010

(54) VEHICLE SUBFRAME AND BUSH MOUNTING STRUCTURE

(75) Inventors: Tsutomu Ogawa, Saitama (JP);
Haruyuki Iwasaki, Saitama (JP); Izuru Hori, Saitama (JP); Yuichi Nagai, Saitama (JP); Hiroshi Akiyama, Saitama (JP); Kunihiko Kimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/491,862

(22) Filed: Jun. 25, 2009

(65) Prior Publication Data

US 2009/0322050 A1    Dec. 31, 2009

Related U.S. Application Data

(62) Division of application No. 10/574,856, filed on Apr. 6, 2006, now Pat. No. 7,584,815.

(30) Foreign Application Priority Data

Mar. 31, 2004  (JP)  .............................. 2004-102133
Mar. 31, 2004  (JP)  .............................. 2004-102969

(51) Int. Cl.
*B62D 21/11*    (2006.01)
(52) U.S. Cl. ........................ 280/124.109; 280/124.166; 280/124.13; 280/788
(58) Field of Classification Search .......... 280/124.166, 280/124.109, 788, 124.134, 124.13; 267/292–294, 267/141.2–14.5, 141.12, 141.7, 141; 403/220–229, 403/78, 79, 119, 120, 161–163; 384/202–206
See application file for complete search history.

(56) References Cited

U.S. PATENT DOCUMENTS

| 5,562,308 | A  | 10/1996 | Kamei et al. |
| 6,487,886 | B2 | 12/2002 | Ueno et al. |
| 6,511,096 | B1 | 1/2003  | Kunert et al. |
| 6,543,857 | B1 | 4/2003  | Griffiths et al. |

(Continued)

FOREIGN PATENT DOCUMENTS

DE    199 20 051 A1    11/2000

(Continued)

*Primary Examiner*—Ruth Ilan
(74) *Attorney, Agent, or Firm*—Arent Fox, LLP

(57) ABSTRACT

A front cross member 202 of a rear subframe 53 has a recessed portion 221 which is recessed continuously over a longitudinal direction thereof. The recessed portion 221 is formed at a lower portion of the cross member 202 and is recessed upwardly, and an elastic bush 240 is fitted in a resulting recess. The elastic bush 240 has an elastic element 243 which connects together an inner tube 241 and an outer tube 242 which surrounds the inner tube 231 and is mounted on the rear subframe 53 at the recessed portion 221 as a bracket. The bracket 221 has bracket plate portions 263a, 263b which each have a plane which is brought into contact with an end face of the inner tube and folded-back portions 235, 235. The bracket 221 is disposed in such a manner as to hold therein both ends of the inner tube 241 and is configured such that the elastic bush 240 is mounted thereon by passing a bolt 224 through the inner tube 241.

5 Claims, 22 Drawing Sheets

U.S. PATENT DOCUMENTS

| | | |
|---|---|---|
| 6,629,962 B2 | 10/2003 | Correa et al. |
| 2002/0105159 A1 | 8/2002 | Christophliemke et al. |
| 2003/0122344 A1 | 7/2003 | Herzig |
| 2004/0021285 A1 | 2/2004 | Frasch et al. |

FOREIGN PATENT DOCUMENTS

| | | |
|---|---|---|
| DE | 100 52 940 A1 | 5/2001 |
| DE | 101 07 960 A1 | 8/2002 |
| JP | 4-59405 A * | 2/1992 |
| JP | 8-58614 | 3/1996 |
| JP | 8-67269 | 3/1996 |
| JP | 11-278298 | 10/1999 |
| JP | 2601866 Y2 | 10/1999 |
| JP | 2000-168372 A | 6/2000 |
| JP | 2000-238657 A | 9/2000 |
| JP | 2002-87291 A | 3/2002 |
| JP | 2002-337721 A | 11/2002 |
| JP | 2003-146240 A | 5/2003 |

* cited by examiner

FIG. 14
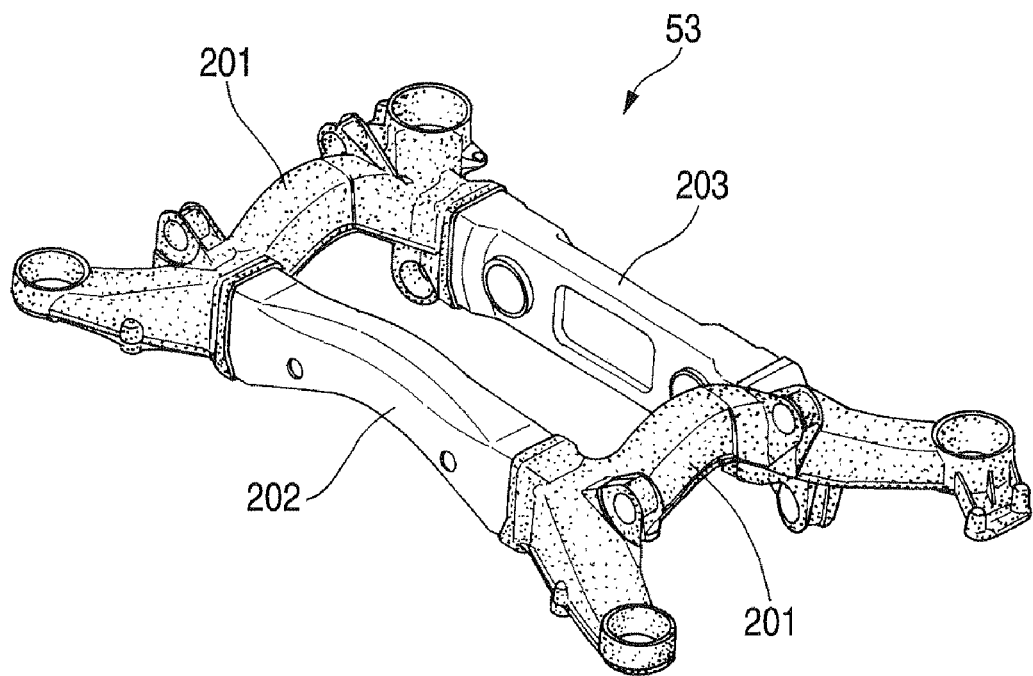
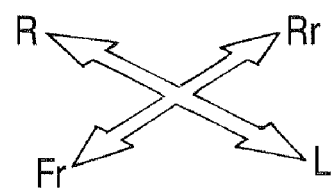

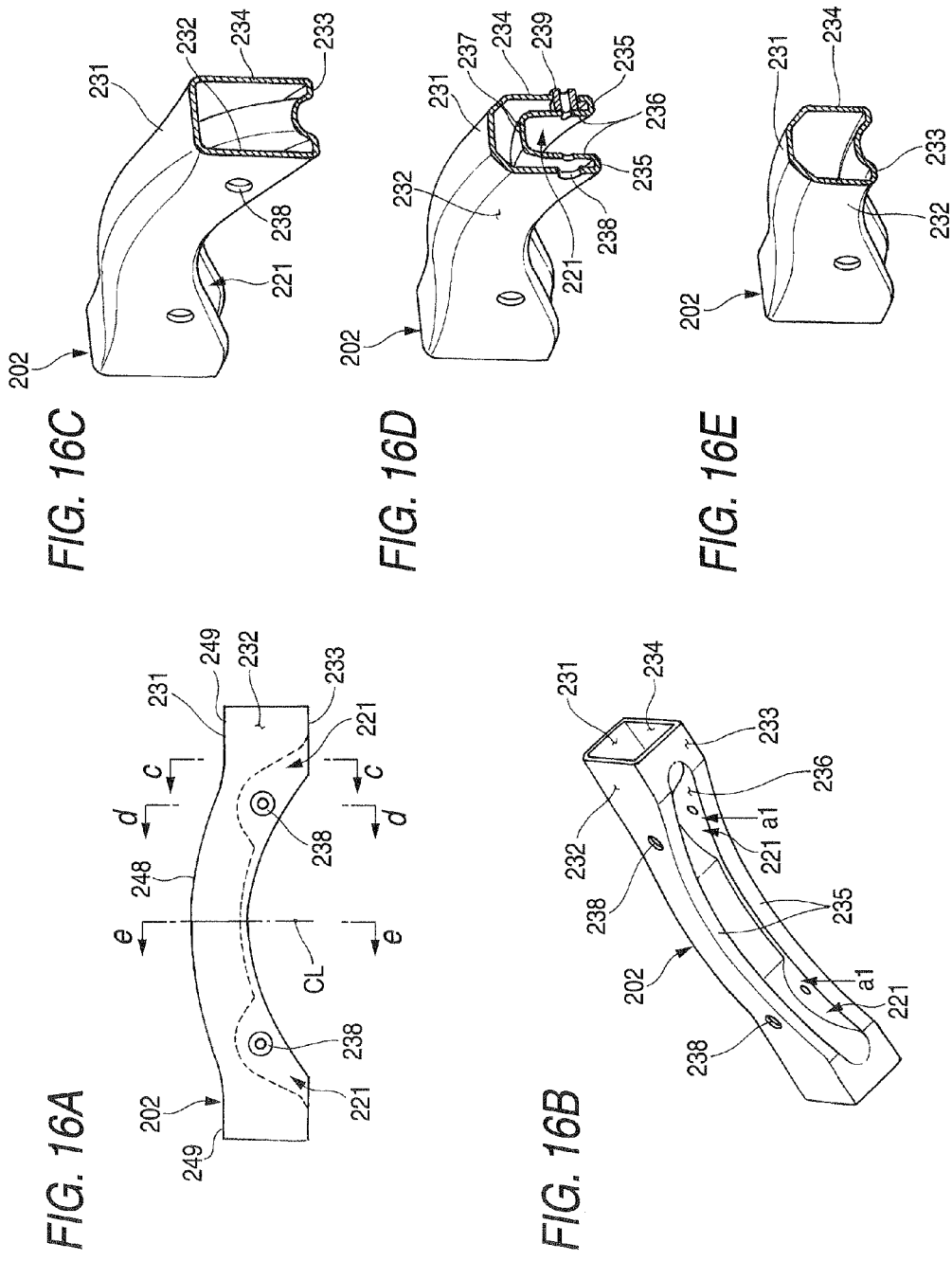

(RELATED ART)

ically cross-sectional shapes of the recessed portion of the fuel tank on the vehicle subframe and tubular cross member are not provided in the problem disclosed in the invention.

VEHICLE SUBFRAME AND BUSH MOUNTING STRUCTURE

CROSS REFERENCE TO RELATED APPLICATION

This is a Divisional Application, which claims the benefit of pending U.S. patent application Ser. No. 10/574,856, filed Apr. 6, 2006, which claims priority of Japanese Patent Application Nos. 2004-102133 and 2004-102969. The disclosure of the prior application is hereby incorporated herein in its entirety by reference.

TECHNICAL FIELD

The present invention relates to a vehicle subframe which is mounted on a body and on which a suspension system and a differential gearbox are mounted.

In addition, the invention relates to an improved technique for a bush mounting structure for mounting an elastic bush on a frame.

BACKGROUND ART

A vehicle subframe is such that longitudinal and transverse tubular members are joined together to thereby form, for example, a structure having the shape of projecting parallels and needed mount portions are formed on the structure, and there is known, for example, a subframe in which cylindrical members are joined to ends of longitudinal and transverse members for attachment to a body. (Refer, for example, to JP-A-2003-146240 (hereinafter, referred to as Patent Document No. 1) (Page 4, FIG. 1)).

Patent Document No. 1 will be described based on the following figure.

FIG. 22 is an explanatory diagram which explains a basic configuration of the related art. A conventional automotive subframe is such that collar members 1302 are joined to distal end portions of a subframe main body 1301 for connecting the subframe to a body frame of a motor vehicle, and in the event that the subframe main body 1301 lacks in dimension, flat portions 1303 of the collar member 1302 are fillet welded (beads 1304) to the subframe main body 1301 in such a state that the flat portions 1303 are displaced as shown in (c).

In the automotive subframe of Patent Document No. 1, while the collar members 1302 at both ends of the subframe main body 1301 are fixed to the body and for example, a differential gearbox is mounted on the subframe main body 1301, the subframe main body 1301 is liable to be deformed, and there has been desired a structure which can increase the strength without interrupting the lightening of the weight of the subframe main body 1301.

In addition, in a bush mounting structure in which various types of members are mounted on a frame such as a body frame by brackets via elastic bushes, the elastic bush is made up of an inner tube, an outer tube which surrounds the inner tube and an elastic element which connects between the inner tube and the outer tube. There are known various types bush mounting structures like this (refer, for example, to Japanese Utility Model Registration No. 2601866 (hereinafter, referred to as Patent Document No. 2) (FIGS. 1 to 4)).

A conventional bush mounting structure shown in Patent Document No. 2 will be described based on the following figure, FIG. 21.

FIGS. 21(a), (b) are schematic diagrams of a conventional bush mounting structure, wherein FIG. 21(a) shows a side configuration of the bush mounting structure and FIG. 21(b) shows a cross-sectional configuration taken along the line b-b in FIG. 21(a).

This conventional bush mounting structure is such that left and right lateral linkages 303, 303 are mounted on a subframe 301 mounted on a body by a bracket 302 in such a manner as to swing. Elastic bushes 304, 304 are used at these mount portions to enable such a mounting.

As shown in FIG. 21(b), the subframe 301 is a pressed product which is formed into a downwardly oriented U-shape section component by joining together an upper half 305, which is placed upper, and a forward-placed front lower 306 and a rearward-placed rear lower 307 which are joined to a lower portion of the upper half 305.

The subframe 301 constructed as described above is such that a bracket, as a separate member, made up of a downwardly oriented U-shape section component is inserted to be mounted between a lower end portion of the front lower 306 and a lower end portion of the rear lower 307. The elastic bushes 304, 304 can be mounted on the subframe 301 by bolts 308, 308 which pass through the bracket 302, the lower end portion of the front lower 306 and the lower end portion of the rear lower 307.

Incidentally, the bracket 302 is required to sufficiently bear loads exerted thereon from axial and radial directions of the elastic bushes 304, 304, as well as transmitting the loads to the subframe 301 with good efficiency. To this end, the mounting strength and support rigidity of the bracket 302 on which the elastic bushes 304, 304 are mounted are wanted to be increased. Moreover, the bracket 302 is required to be simple in configuration.

As shown in FIG. 21(b), however, the aforesaid conventional bush mounting structure only constitutes a configuration in which the U-shape section bracket 302 is interposed between the front and rear lowers 306, 307. There still exists a room for improvement in attempting to increase the mounting strength and support rigidity of the bracket 302 on which the elastic bushes 304, 304 are mounted.

DISCLOSURE OF THE INVENTION

A problem that the invention is to solve is to provide a vehicle subframe whose strength is increased.

In addition, another problem that the invention is to solve is to provide a technique which can increase through a simple configuration the mounting strength and support rigidity of a bracket on which elastic bushes are mounted.

According to a first aspect of the invention, there is provided a vehicle subframe including a pair of left and right longitudinal members, which extends in a longitudinal direction of a body, which each have a body mount portion and a mount portion on which a suspension arm is mounted, and a tubular cross member which extends in a transverse direction of the body and connects together the pair of left and right longitudinal members, characterized in that the cross member has a recessed portion which is recessed continuously over a longitudinal direction thereof.

According to a second aspect of the invention, the vehicle subframe is characterized in that the recessed portion is formed at a lower portion of a main body of the cross member and is recessed upwardly, and that a damping member is fitted in a resulting recess.

According to a third aspect of the invention, the vehicle subframe is characterized in that the tubular cross member is a member which is formed into a shape having a substantially quadrangular closed section by an upper plate, a front side plate, a lower plate, and a rear side plate, and that the recessed portion is configured such that a sectional shape of the cross member which lies normal to an axis thereof is recessed towards an inside of the section and has a front bracket plate portion which is parallel to the front side plate, a rear bracket plate portion which is parallel to the rear side plate and folded-back portions which are folded back from the front and rear bracket plate portions.

According to the first aspect of the invention, since the cross member has the recessed portion which is continuously recessed over the longitudinal direction thereof, the recess in the recessed portion produces a state in which a U-shaped member is added within a tubular shape, whereby the strength against loads (section modulus) is increased, an advantage being thereby provided that the strength can be increased.

According to the second aspect of the invention, since the recessed portion is formed in the lower portion of the main body of the cross member and is recessed upwardly and the damping member is fitted in the recess, a load is transmitted to the recessed portion via the damping member, so as to be borne by the recessed portion, and as a result, there is provided an advantage that the strength of the cross member can be increased.

According to the third aspect of the invention, since the recessed portion has the front bracket portion which is parallel to the front side plate and the rear bracket plate portion which is parallel to the rear side plate, the strength against the load W (section modulus) is increased by the front and rear bracket plate portions, whereby there is provided an advantage that the strength can be increased.

According to a fourth aspect of the invention, there is provided a bush mounting structure for mounting on a frame by a bracket an elastic bush in which an inner tube and an outer tube which surrounds the inner tube are connected together by an elastic body, wherein the bracket is disposed in such a manner as to hold both ends of the inner tube therein, and the elastic bush is mounted by passing a bolt through the inner tube, the bush mounting structure being characterized in that the bracket has bracket plate portions each having a plane which contacts an end face of the inner tube and folded-back portions which are folded back from the bracket plate portions.

According to a fifth aspect of the invention, the bush mounting structure is characterized in that the bracket plate portions and the folded-back portions are made to oppositely face each other via a given space portion.

According to a sixth aspect of the invention, the bush mounting structure is characterized in that the frame is made up of a tubular member, that the shape of a section of the tubular member which lies normal to an axis thereof is configured so as to be recessed towards an inside of a section of the tubular member, and that the bracket plate portions are formed on inner surfaces of a resulting recessed portion, while the folded-back portions are formed continuously from the tubular member.

According to the fourth aspect of the invention, notwithstanding a simple configuration in which only the planes which are brought into contact with the end faces of the inner tube of the elastic bush are provided on the bracket plate portions of the bracket and, furthermore, the folded-back portions are provided by folding back edges of the bracket plate portions, the rigidity of the bracket plate portions can be increased by the folded-back portions. Due to this, the mounting strength and support rigidity of the bracket on which the elastic bush is mounted can be increased. Consequently, a load exerted on the bracket plate portions from the elastic bush can sufficiently borne by the bracket and the load can be transmitted to the frame with good efficiency.

According to the fifth aspect of the invention, since the bracket plate portions and the folded-back portions are made to oppositely face each other via the given space portion, the rigidity of a composite component made up of the bracket plate portions and the folded-back portions can be increased by such an extent. Thus, the rigidity of the bracket plate portions and the folded-back portions can be increased further.

According to the sixth aspect of the invention, since the bracket plate portions are formed on the inner surfaces of the recessed portion which is configured so as to be recessed towards the inside of the section of the frame which is made up of the tubular member, the bracket can be formed integrally on the frame made up of the tubular member with a simple configuration. Due to this, there is no need to mount a bracket made up of a separate member on the frame. Since the number of components can be reduced, the lightening of the weight of the composite component made up of the frame and the bracket can be realized, and the reduction in the production costs of the bush mounting structure can be realized. Furthermore, since there is no need to join a bracket made up of a separate member to the frame, the manufacturing accuracy with which the composite component made up of the frame and the bracket can be increased. Moreover, the load exerted on the bracket plate portions from the elastic bush can be transmitted to the frame with good efficiency.

Furthermore, since the folded-back portion which are folded back from the bracket plate portions are formed continuously from the tubular member, the load exerted on the bracket plate portions from the elastic bush can be borne by the entirety of the tubular member via the folded-back portions in an ensured fashion. The support rigidity of the bracket which supports the elastic bush can be increased with better efficiency.

BRIEF DESCRIPTION OF THE DRAWINGS

FIG. 14 is an explanatory diagram which explains materials for respective members which make up the rear subframe according to the invention, FIGS. 16(a) to (e) are diagrams which show the configuration of a front cross member according to the invention.

Figure 1:
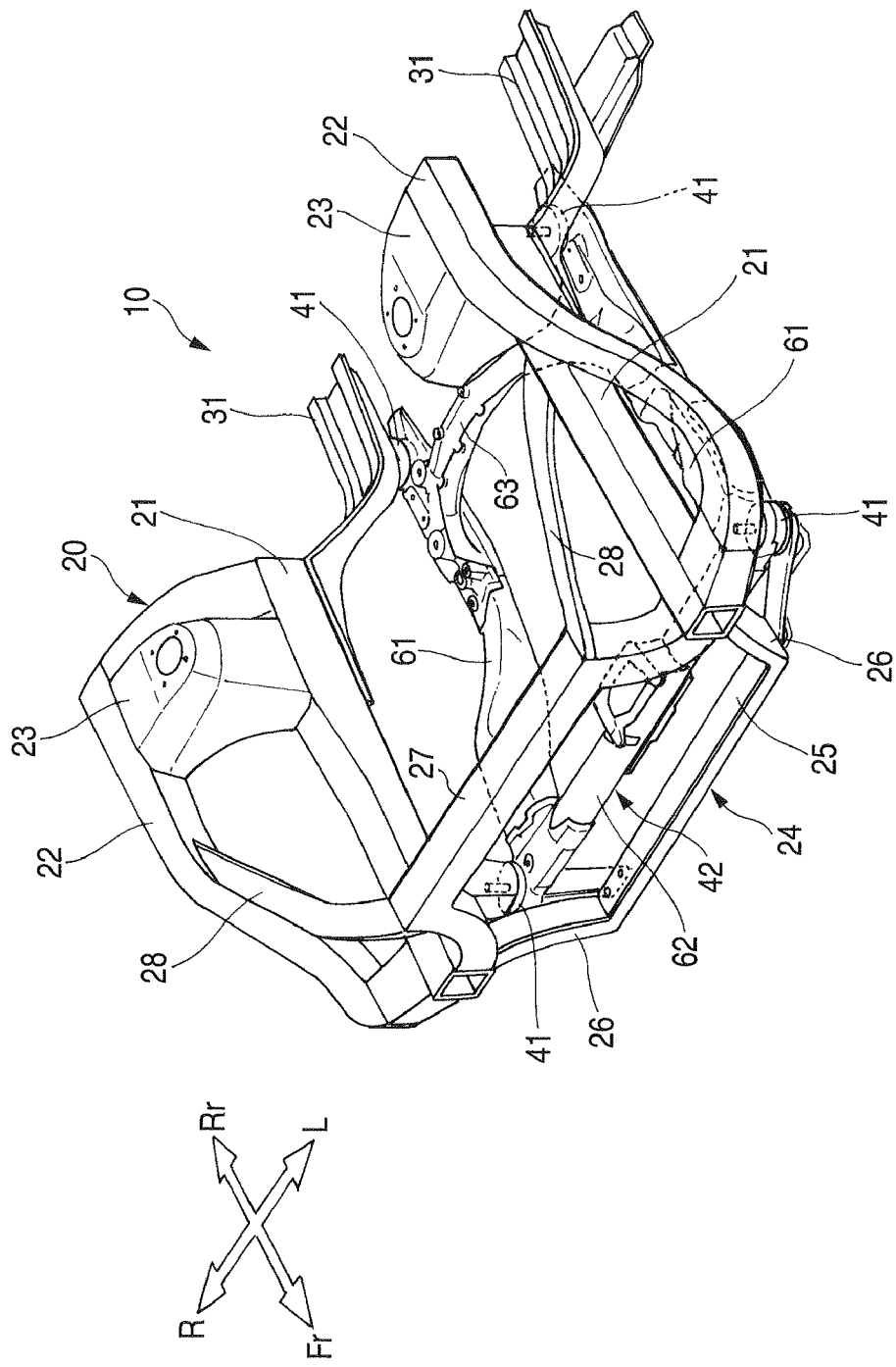
FIG. 1 is a perspective view of a front part of a vehicle according to the invention.

Note that in the figures, reference numeral 10 denotes a vehicle, 20 a body frame, 42 a front subframe, 53 a rear subframe (a vehicle subframe), 61, 202 a frame (a tubular member), 81, 221 a bracket (a recessed portion), 95, 235 a folded-back portion; 96, 236a, b a bracket plate portion, 100, 240 an elastic bush, 101, 241 an inner tube, 102, 242 an outer tube, 103, 243 an elastic element, 104, 244 a bolt and S1, S2 a given space portion.

BEST MODE FOR CARRYING OUT THE INVENTION

A best mode for carrying out the invention will be described below based on the accompanying drawings. Note that "front", "rear", "left", "right", "up" and "down" denote directions as viewed from the driver, and Fr denotes front, Rr denotes rear, L denotes left, R denotes right and CL denotes a center of a body (a transverse center).

Figure 2:
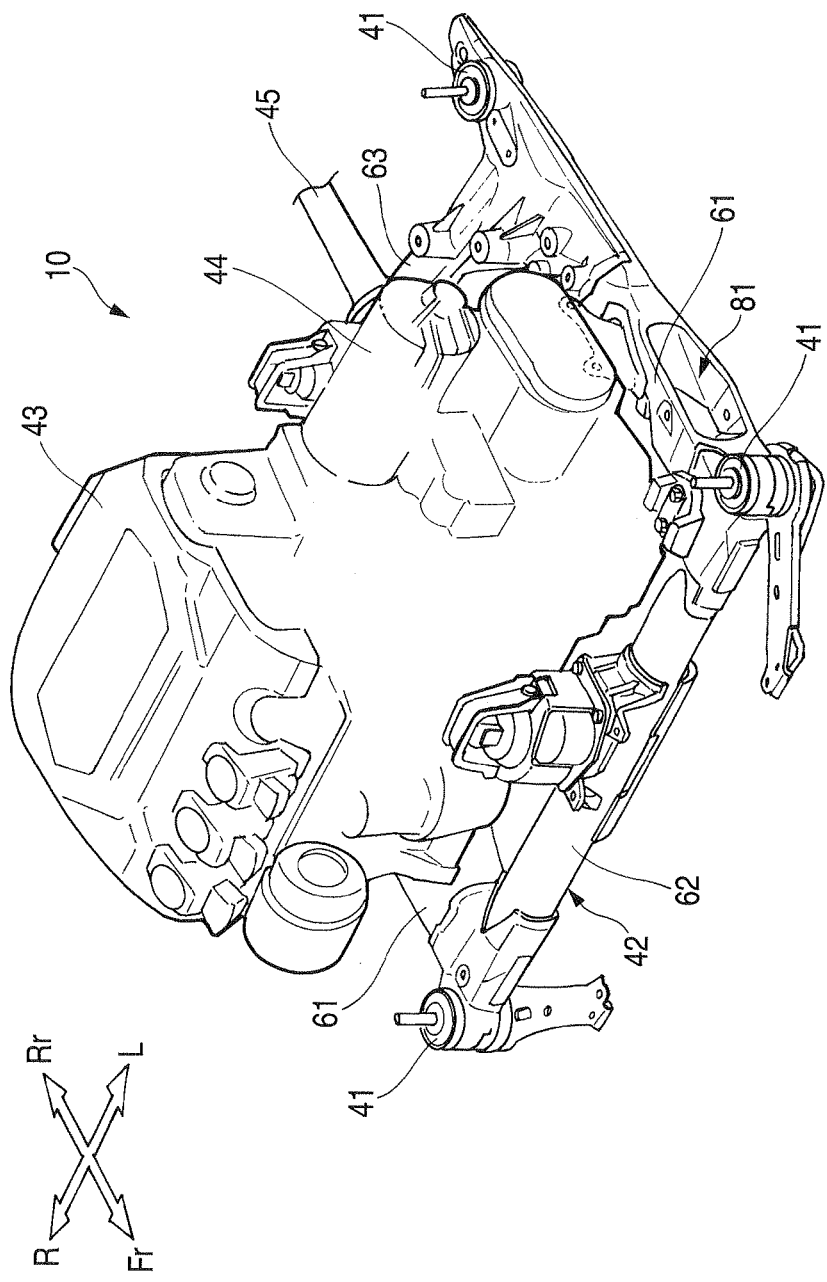
FIG. 2 is a perspective view showing surroundings of front side frames according to the invention.
Figure 3:
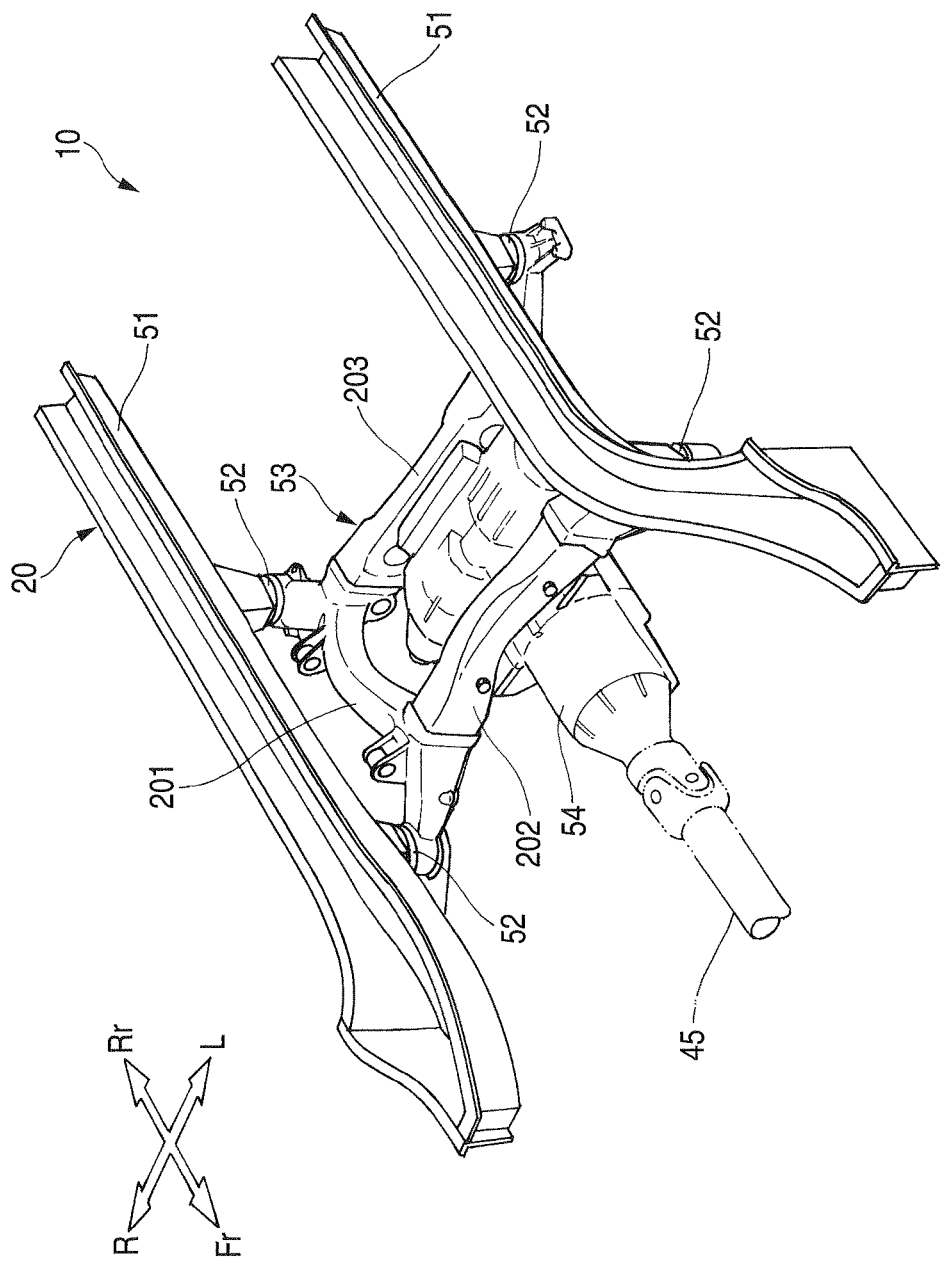
FIG. 3 is a perspective view of a rear part of the vehicle according to the invention.

Firstly, a vehicle will briefly be described based on FIGS. 1 to 3.

FIG. 1 is a perspective view of a front part of a vehicle according to the invention. A front part of a body frame (a body) 20 of a vehicle 10 is constructed into a monocoque body which is mainly made up of left and right front side frames 21, 21 which extend in a longitudinal direction of the body on both sides of the front part of the body, left and right upper frames 22, 22 which lie transversely outside and above the left and right front side frames 21, 21 and which extend in the longitudinal direction of the body, left and right front damper housings 23, 23 which are extended between the left and right front side frames 21, 21 and the left and right upper frames 22, 22, and a front bulkhead 24 connected to front portions of the left and right front side frames 21, 21 and front portions of the left and right upper frames 22, 22.

The front bulkhead 24 is mainly made up of a lower cross member 25 which extends in a transverse direction below the front portions of the left and right front side frames 21, 21, left and right side stays 26, 26 which extend upwardly from both end portions of the lower cross member 25 and an upper cross member 27 which extends in the transverse direction so as to connect together upper ends of the side stays 26, 26.

The upper cross member 27 is such that left and right extensions 28, 28 are extended obliquely rearwards from left and right end portions thereof so as to connect to longitudinal intermediate portions of the left and right upper frames 22, 22 via the extensions 28, 28.

The body frame 20 configured as described above is configured such that a front subframe 42 is suspended therefrom at the front portions of the left and right front side frames 21, 21 and front end portions of left and right floor frames 31, 31 which extend rearwards, respectively, from rear ends of the front side frames 21, 21 via four front, rear, left and right vibration preventive elastic bushes 41 . . . ( . . . denotes a plural number, and this will be true hereinafter).

FIG. 2 is a perspective view which shows surroundings of the front side frames. The front subframe 42 is such that an engine 43 is mounted on a right half portion and a transmission 44 is mounted on a left half portion thereof. In the transmission 44, a propeller shaft 45 extends rearwards from an output side for transmission of power.

FIG. 3 is a perspective view of a rear part of the vehicle according to the invention. The rear part of the body frame 20 is mainly made up of left and right rear side frames 51, 51 which extend in the longitudinal direction of the body on both sides of the rear part of the body and is configured such that a rear subframe 53 (a vehicle subframe) is suspended from these rear side frames 51, 51 via four front, rear, left and right vibration preventive elastic bushes 52 . . . .

A rear differential gearbox 54 is mounted on the rear subframe 53 using a suspension method, and a rear suspension 260 (refer to FIG. 20) is mounted on the rear subframe 53. The rear subframe 53 includes left and right longitudinal members 201, 201, a front cross member 202 which is provided forward and a rear cross member 203 which is provided rearward. In the rear subframe 53, the forward-placed front cross member 202 exhibits a curved shape which is curved such that both end portions become horizontal while a central portion thereof become convex upwardly, that is, an arch shape in order to avoid the interference with the rear differential gearbox 54. The details of the front cross member 202 will be described later on.

Power transmitted from the propeller shaft 45 (refer to FIG. 2) can be distributed to be transmitted to left and right rear road wheels by left and right drive shafts via rear differential gears within the rear differential gearbox 54. As is clear from the description that has been made heretofore and FIGS. 2 and 3, the vehicle 10 is a four-wheel drive vehicle in which front and rear road wheels are driven by an engine 43 installed at the front part of the body.

Figure 4:
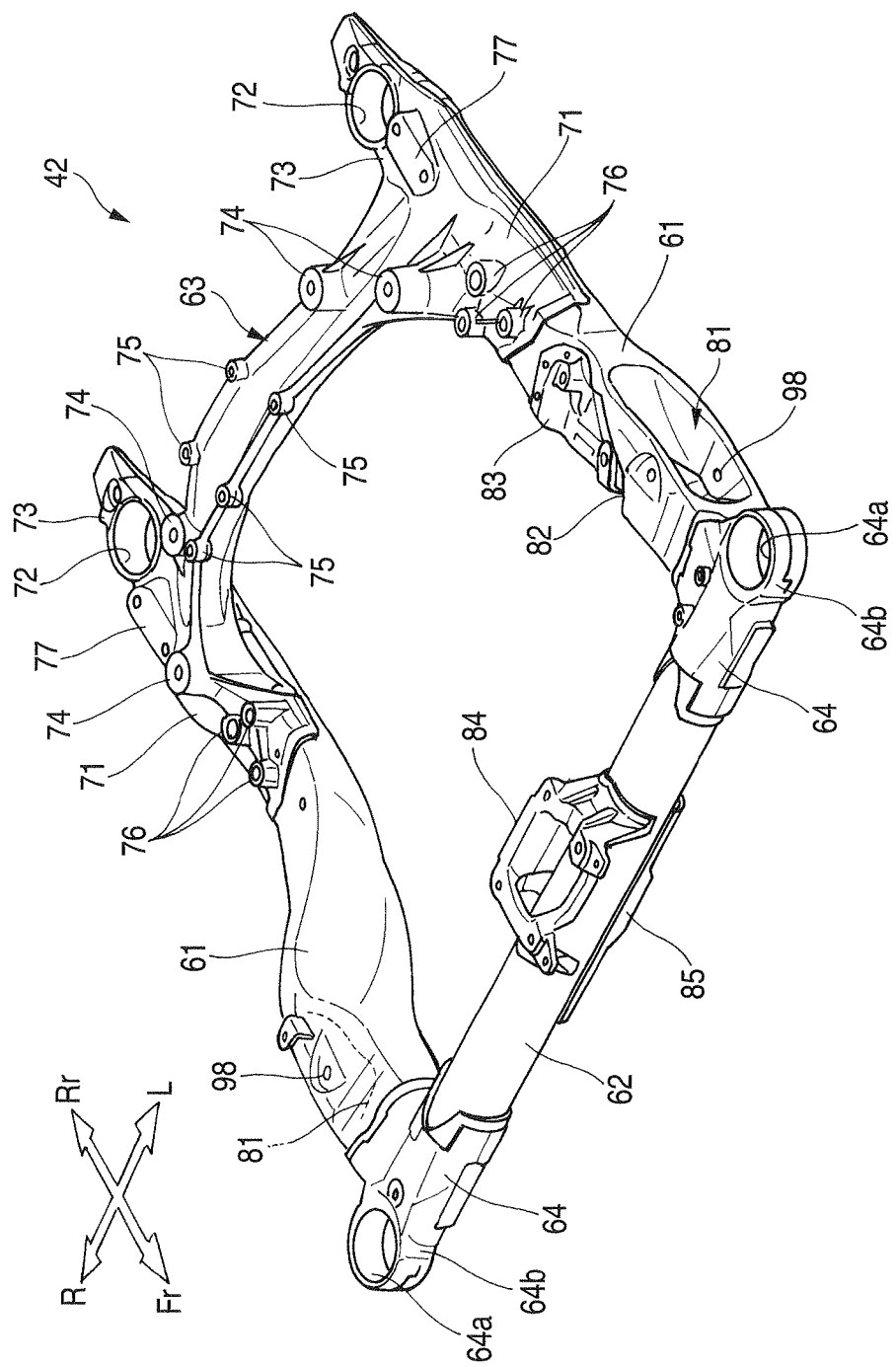
FIG. 4 is a perspective view of a front subframe according to the invention.
Figure 5:
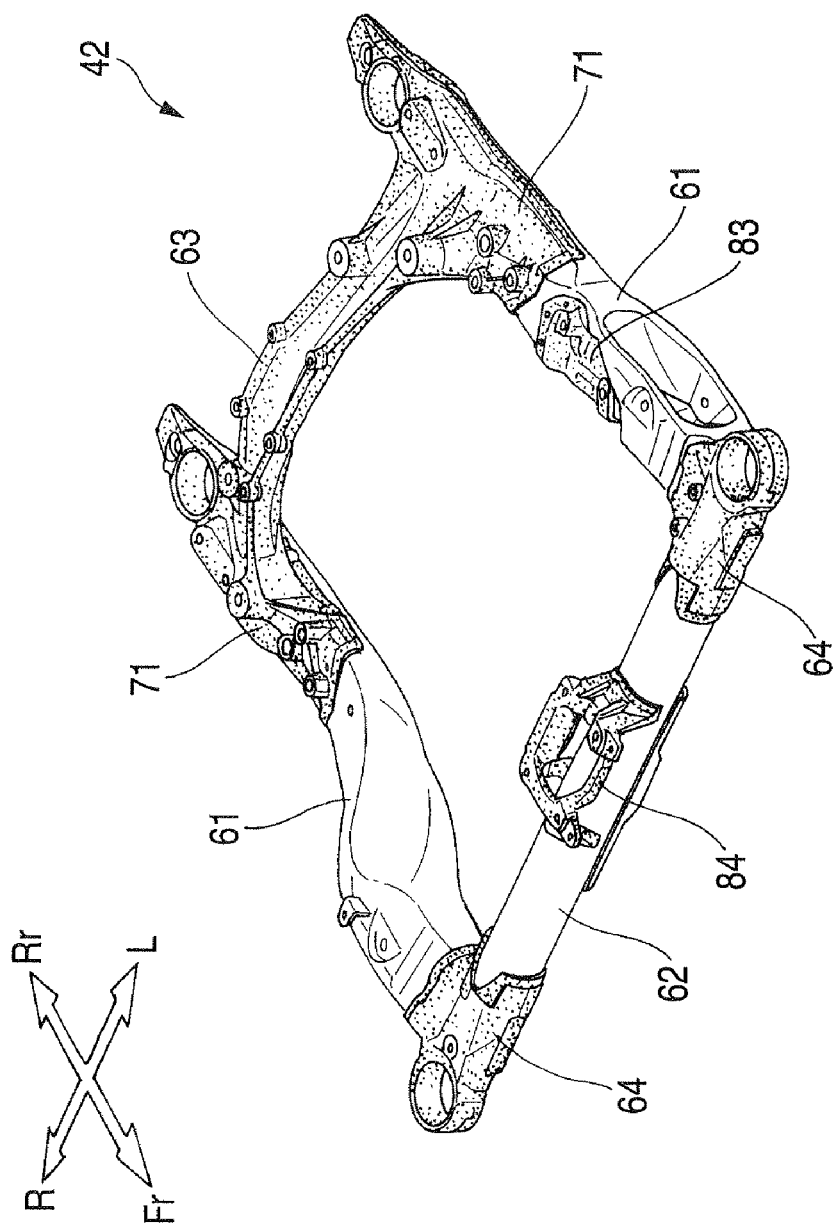
FIG. 5 is an explanatory diagram which explains materials for respective members which make up the front subframe according to the invention.
Figure 6:
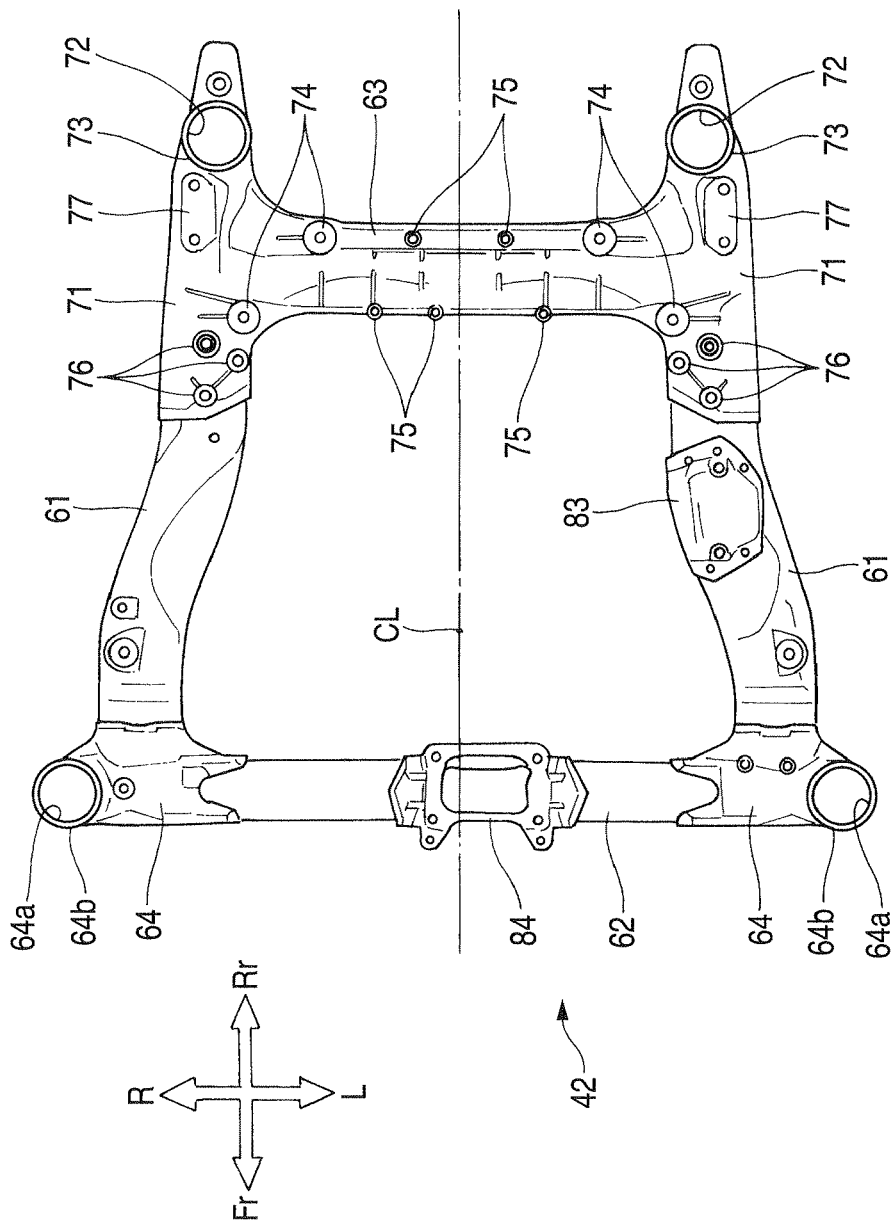
FIG. 6 is a plan view of the front subframe according to the invention.
Figure 7:
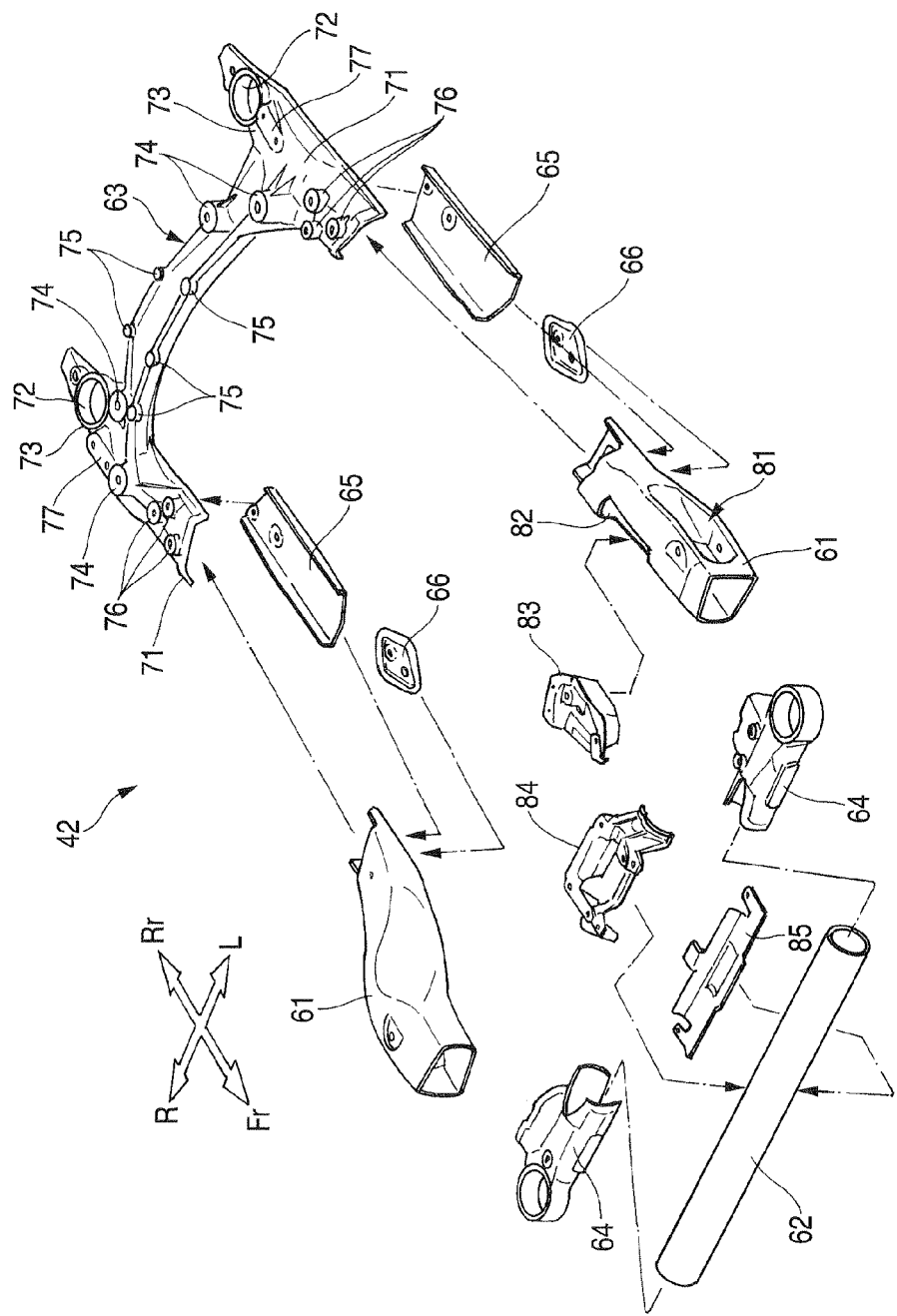
FIG. 7 is an exploded perspective view of the front subframe according to the invention.

Next, an overall configuration of the front subframe 42 will be described based on FIGS. 4 to 7. FIG. 4 is a perspective view of the front subframe according to the invention. FIG. 5 is an explanatory diagram which explains materials for respective members which make up the front subframe according to the invention. FIG. 6 is a plan view of the front subframe according to the invention. FIG. 7 is an exploded perspective view of the front subframe according to the invention.

As shown in FIGS. 4 and 5, the front subframe 42 is a product made of a metallic material, for example, an aluminum product or aluminum alloy product (hereinafter, generally referred to as an aluminum alloy product). Among respective members shown in FIG. 5, a material shown white denotes an extruded material (an extruded product) or a protruded material (a protruded product) and a material shown satinized or shaded with dots denotes a diecast product.

As shown in FIGS. 4, 6 and 7, the front subframe 42 exhibits substantially the shape of projecting parallels (the shape of a sharp) or the shape of a hollowed square as viewed from the top thereof and is made up of left and right longitudinal members 61, 61 which extends in the longitudinal direction of the body, a front cross member 62 which extends in a transverse direction of the body so as to extend between front ends of the left and right longitudinal members 61, 61, a rear cross member 63 which extends in the transverse direction of the body so as to extend between rear ends of the left and right longitudinal members 61, 61, left and right primary connecting members 64, 64 which connect end portions of the front cross member 62 to front end portions of the left and right longitudinal members 61, 61, left and right stiffening plates 65, 65 (refer to FIG. 7) which are placed, respectively, on lower end faces of rear end portions of the left and right longitudinal members 61, 61 and left and right secondary connecting members 66, 66 (refer to FIG. 7) which connect end portions of the rear cross member 63 to end portions of the left and right longitudinal members 61, 61.

The left and right longitudinal members 61, 61 are side members of molded products formed by obtaining a square pipe from, for example, a tubular extruded material (an extruded product) and further applying a bulging process to the square pipe so obtained so as to form it into a partially irregular shape. The front cross member 62 is a cross member of a round pipe which is obtained from, for example, a tubular extruded material (an extruded product). The left and right primary connecting members 64, 64 are diecast products each formed into an L-shape as viewed from the top thereof and include body mount portions 64b each having a vertically penetrating through hole 64a which are integrally formed at corners thereof. The longitudinal members 61, 61 and the front cross member 62 are inserted into the left and right primary connecting members 64, 64 so as to be joined integrally thereto.

The rear cross member 63 is a cross member made up of a diecast product which is formed substantially into an H-shape. To describe specifically, the rear cross member 63 is characterized by being a substantially U-shape section component as viewed from a side thereof, being curved into an arc shape which protrudes upwardly and having formed integrally at left and right ends thereof left and right sub-longitudinal members 71, 71 which extend in the longitudinal direction of the body.

As shown in FIG. 7, the left and right sub-longitudinal members 71, 71 are downwardly oriented angular channel section components and have formed integrally at rear portions thereof body mount portions 73, 73 having vertically penetrating through holes 72, 72. On the other hand, the left and right stiffening plates 65, 65 are upwardly oriented angular channel section components. The stiffening plates 65, 65 are overlapped on at least front half portions of lower surfaces of the sub-longitudinal members 71, 71 so as to be joined thereto, whereby the sub-longitudinal members 71, 71 can be formed into closed section components.

Furthermore, by (1) joining the rear end portions of the left and right longitudinal members 61, 61 to front end portions of the left and right sub-longitudinal members 71, 71, and (2) overlapping the secondary connecting members 66, 66 on lower surfaces of the rear end portions of the left and right longitudinal members 61, 61 and lower surfaces of front end portions of the stiffening plates 65, 65, (3) the longitudinal members 61, 61 can integrally be joined to both the ends of the rear cross member 63.

As is clear from what has been described heretofore, the sub-longitudinal members 71, 71 and the stiffening plates 65, 65 function as connecting members for joining the longitudinal members 61, 61 integrally to both the ends of the rear cross member 63 and also double as the longitudinal members 61, 61.

The rear cross member 63, which is configured as described above, has integrally a plurality of primary boss portions 74 . . . which protrude upwardly from both left and right ends of each of a front edge and a rear edge thereof and a plurality of secondary boss portions 75 . . . which protrude upwardly from a central portion of each of the front edge and the rear edge thereof.

The left and right sub-longitudinal members 71, 71 each have integrally three upwardly protruding arm mount portions 76 . . . at a front upper portion and an upwardly distended stabilizer bracket mount portion 77 at a rear upper portion thereof.

Figure 8A:
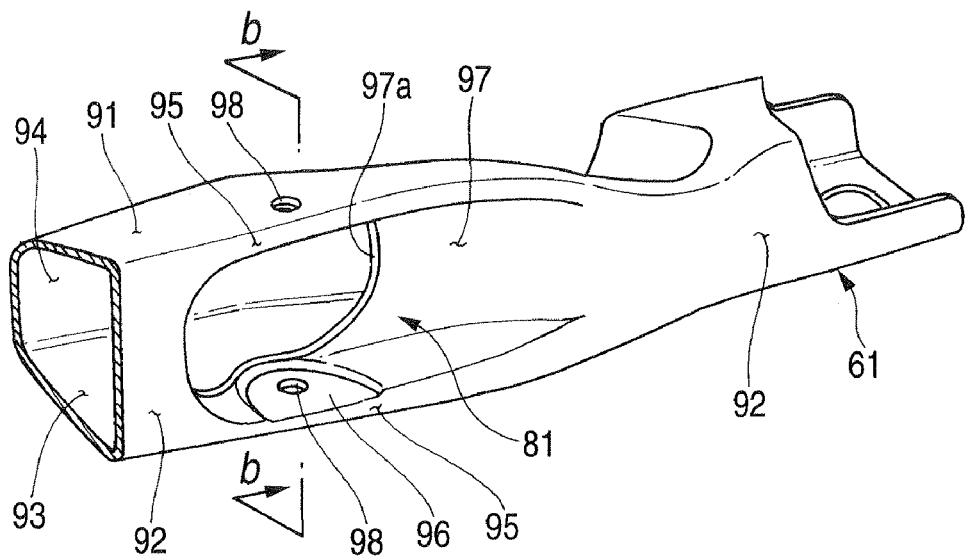
FIGS. 8(a) to (b) are diagrams showing the configuration of a left longitudinal member according to the invention.

Incidentally, the left and right longitudinal members 61, 61 have brackets (recessed portions) 81, 81 (refer to FIG. 8) which are opened transversely outwardly. The left longitudinal member 61 has a diecast cover 83 which covers a transmission support opening 82 which is opened in an upper portion thereof.

The front cross member 62 is such as to have a power plant support portion 84 mounted at an upper central portion and a jack-up portion 85 mounted at a lower central portion Next, the bracket 81 provided on the left longitudinal member 61 will be described based on FIGS. 4, 8 and 9. Note that since the bracket 81 provided on the right longitudinal member 61 has the same configuration as that provided on the left longitudinal member, the description thereof will be omitted.

Figure 8B:
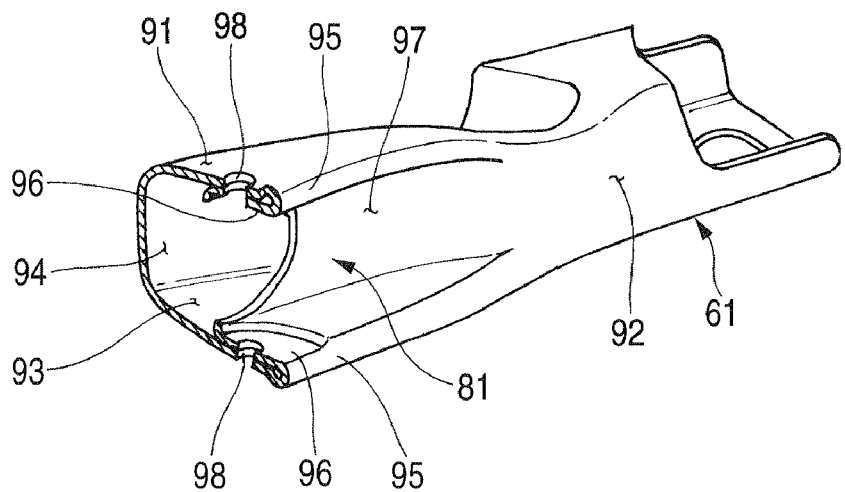

FIGS. 8(*a*), (*b*) are diagrams showing the configuration of the left longitudinal member according to the invention, wherein FIG. 8(*a*) shows the configuration of a main part of the left longitudinal member 61, and FIG. 8(*b*) shows the configuration of the main part of the longitudinal member 61 taken along the line b-b in FIG. 8(*a*).

FIGS. 9(*a*), (*b*) are diagrams showing the configuration of the left longitudinal member 61 according to the invention, wherein FIG. 9(*a*) shows the configuration of a section taken along the line b-b in FIG. 8(*a*), and FIG. 9(*b*) shows a bush mounting structure in which an elastic bush 100 is mounted in the sectional portion shown in FIG. 9(*a*).

As shown in FIGS. 8 and 9, the left longitudinal member 61 is a frame made of a tubular member, and this tubular member is a member that is formed so as to have a substantially quadrangular closed section by an upper plate 91, an outboard side plate 92, a lower plate 93 and an inboard side plate 94. The outboard side plate 92 corresponds to a left side surface of the front subframe 42 shown in FIG. 4.

The left longitudinal member 61 is configured such that the shape of a section which lies normal to an axis thereof is recessed towards an inside of the section, as shown in FIG. 9(*a*), at an intermediate portion along the length thereof, whereby the resulting recessed portion 81 is made to constitute a bracket, with a through hole 97a opened in a bottom 97 of the recessed portion 81.

To describe specifically, the recessed portion 81 is configured into the sectional shape by recessing the outboard side plate 92 in such a manner as to be folded back from an edge of the upper plate 91 and an edge of the lower plate 93 into the inside of the closed section, so that portions of the outboard side plate 92 so folded back extend inwards along the upper and lower plates 91, 93 via resulting upper and lower folded-back portions 95, 95 so as to constitute upper and lower bracket plate portions 96, 96 while a portion between ends of the portions of the outboard side plate 92 so extended constitutes the bottom 97, with the trough hole 97a opened in the bottom 97.

The upper bracket plate portion 96 is a flat plate which is brought into contact with an inner surface of the upper plate 91, and the lower bracket plate portion 96 is a flat plate which is brought into contact with an inner surface of the lower plate 93. Thus, the upper and lower bracket plate portions 96, 96 can be formed on inner surfaces of the recessed portion 81.

As shown in FIG. 9, the bottom 97 constitutes a flat plate which is substantially parallel to the inboard side plate 94 at a position which is spaced apart at a given interval from the inboard side plate 94. The through hole 97a is a large hole which is opened to near upper and lower edges of the bottom 97. Since the bottom 97 is little influenced by an external force, the lightening of the weight of the longitudinal member 61 can be realized by opening the through hole 97a.

Figure 9A:
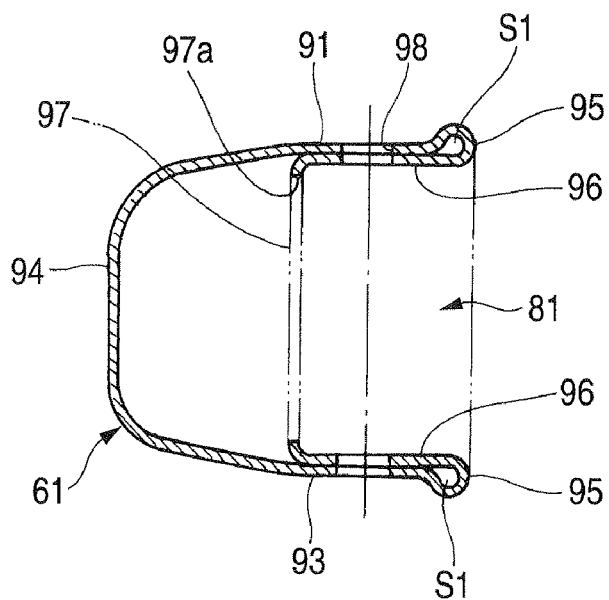
FIGS. 9(a) to (b) are diagrams showing the left longitudinal member according to the invention.

As shown in FIG. 9(a), the folded-back portions 95, 95 are portions which are folded back from the edges of the upper and lower plates 91, 93 to the bracket plate portions 96, 96 in such a manner as to exhibit an annular sectional shape which is slightly vertically distended. Due to this, given space portions S1, S2 are provided within the folded-back portions 95, 95. Consequently, the folded-back portions 95, 95 can be said to be portions which are formed continuously from the longitudinal member 61 which is the tubular member. The folded-back portions 95, 95 and the bracket plate portions 96, 96 are made to oppositely face each other via the given space portions S1, S2.

As is clear from what has been described above, the recessed portion 81, that is, the bracket 81 has the bracket plate portions 96, 96 and the folded-back portions 95, 95 which are folded back from the bracket plate portions 96, 96. Thus, the bracket 81 is characterized in that the bracket 81 is integrally provided on the longitudinal member 61 made up of the tubular member at the intermediate portion along the length thereof (refer to FIG. 8(a)). Furthermore, the bracket 81 has a vertically penetrating bolt through hole 98. This bolt through hole 98 is such as to pass through the upper plate 91, the lower plate 93 and the upper and lower bracket plate portions 96, 96.

Figure 9B:
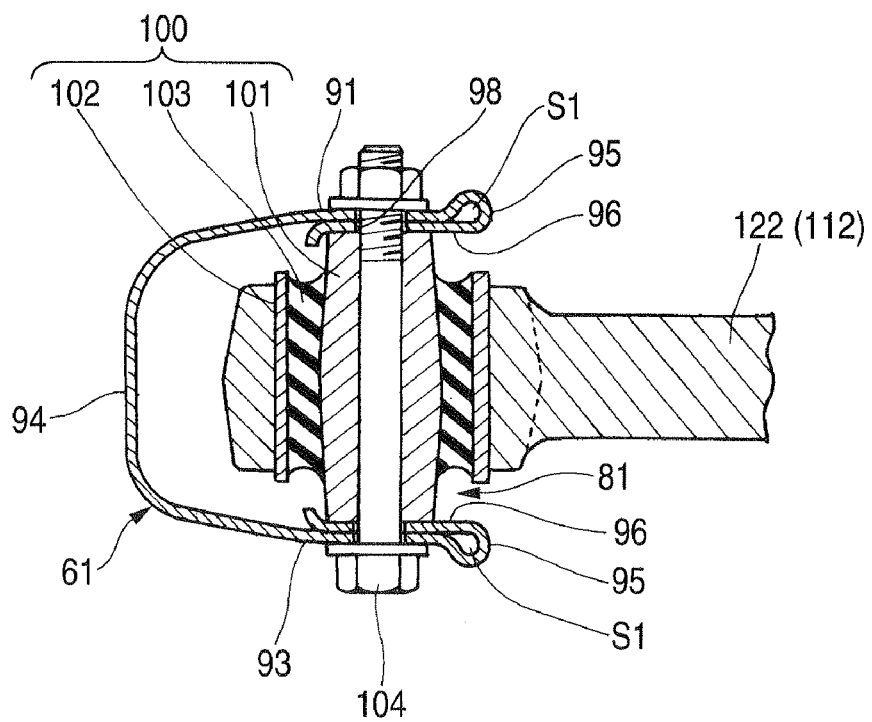

FIG. 9(b) shows the bush mounting structure in which the elastic bush 100 is mounted on the longitudinal member 61 by the bracket 81. The elastic bush 100 is a vibration preventive member configured such that an inner tube 101 and an outer tube 102 which surrounds the inner tube 101 are connected by an elastic element 103 such as a rubber, and an arm member such as a lower arm 112 of a front suspension is integrally provided on the outer tube 102.

The bracket 81 is characterized by being disposed in such a manner that both ends of the inner tube 101 are held by the bracket plate portions 96, 96. The upper and lower bracket plate portions 96, 96 have planes which are brought into contact with respective end faces of the inner tube 101.

By overlapping the upper plate 91 on the upper bracket plate portion 96 and overlapping the lower plate 93 on the lower bracket plate portion 96, the rigidity can be increased, and the elastic bush 100 can be fastened to be supported by the two plates at each of the upper and lower sides of the bracket 81.

As is clear from what has been described above, according to the bush mounting structure shown in FIGS. 8 and 9, notwithstanding a simple configuration in which only the planes which are brought into contact with the end faces of the inner tube 101 of the elastic bush 100 are provided on the bracket plate portions 96, 96 and, furthermore, the folded-back portions 95, 95 are provided by folding back the edges of the bracket plate portions 96, 96, the rigidity of the bracket plate portions 96, 96 can be increased by the folded-back portions 95, 95. Due to this, the mounting strength and support rigidity of the bracket on which the elastic bush 100 is mounted can be increased. Consequently, a load exerted on the bracket plate portions 96, 96 from the elastic bush 100 can sufficiently be borne by the bracket 81 and the load can be transmitted to the longitudinal member 61 with good efficiency.

Furthermore, since the bracket plate portions 96, 96 and the folded-back portions 95, 95 are made to oppositely face each other via the given space portions S1, S2, the rigidity of the composite component made up of the bracket plate portions 96, 96 and the folded-back portions 95, 95 can be increased by such an extent. Thus, the rigidity of the bracket plate portions 96, 96 and the folded-back portions 95, 95 can be increased further.

In addition, since the bracket plate portions 96, 96 are formed on the inner surfaces of the recessed portion 81 by configuring the longitudinal member (frame) 61 made up of the tubular member so as to be recessed towards the inside of the section thereof, the bracket 81 can be formed integrally on the longitudinal member 61 made up of the tubular member with the simple configuration. Due to this, there is no need to mount a bracket made up of a separate member on the longitudinal member 61. Since this enables the reduction in the number of components, the lightening of the weight of the composite component made up of the longitudinal member 61 and the bracket 81 can be realized. Furthermore, since there is no need to join a bracket made up of a separate member to the longitudinal member 61, the accuracy can be increased with which the composite component made up of the longitudinal member 61 and the bracket 81 is manufactured. Moreover, the load exerted on the bracket plate portions 96, 96 from the elastic bush 100 can be transmitted to the longitudinal member 61 with good efficiency.

Furthermore, since the folded-back portions 95, 95 which are folded back from the bracket plate portions 96, 96 are formed continuously from the longitudinal member 61 made up of the tubular member, the load exerted on the bracket plate portions 96, 96 from the elastic bush 100 can sufficiently be borne by the entirety of the longitudinal member 61 via the folded-back portions 95, 95. The support rigidity of the bracket 81 which supports the elastic bush 100 can be increased with better efficiency.

Next, the configuration of surroundings of the front subframe 42 and a front suspension 110 will be described based on FIGS. 10 to 12. Note that since left and right front suspensions are identical in configuration, only a left one will be described, and the description of a right one will be omitted.

Figure 10:
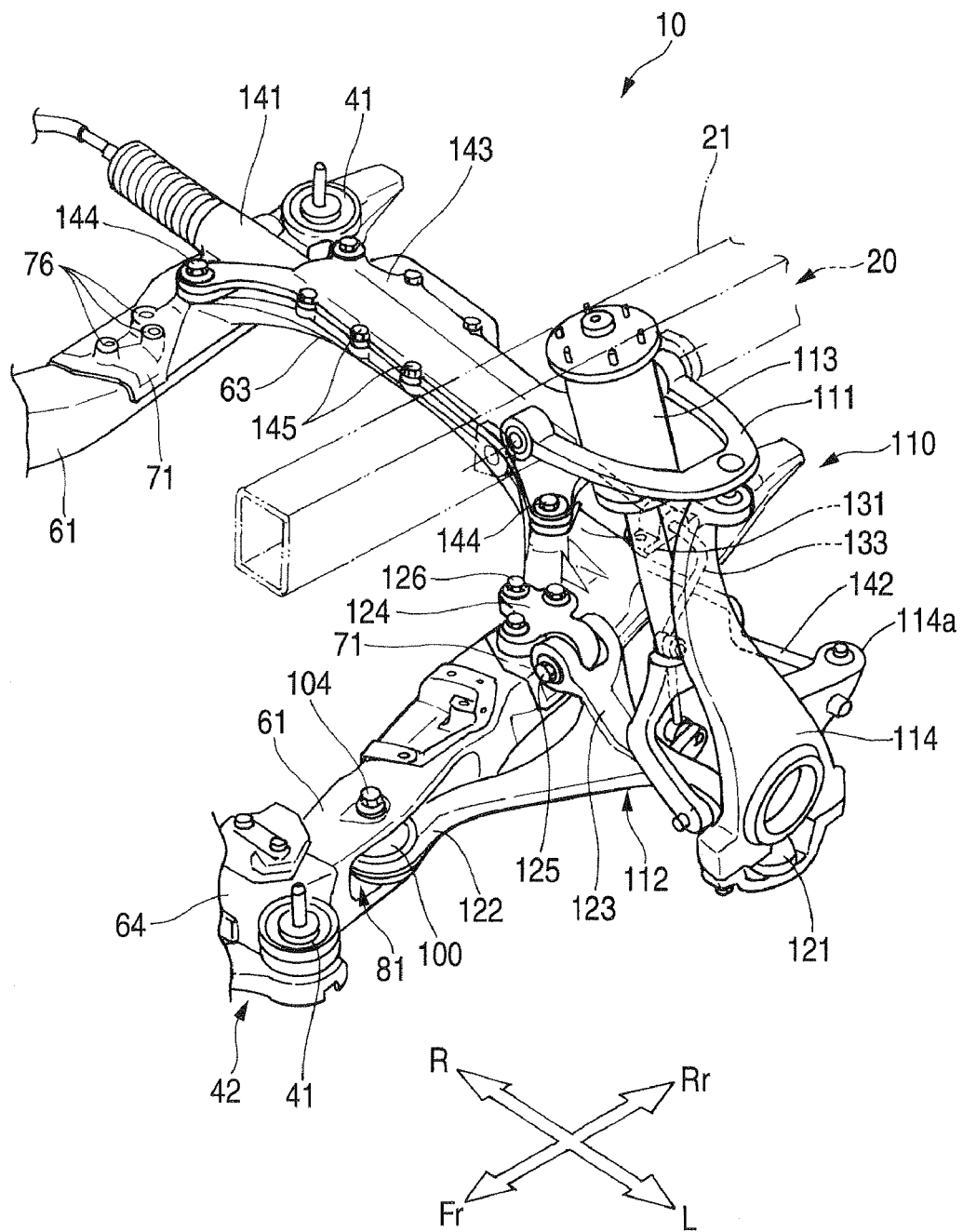
FIG. 10 is a perspective view which shows that a front suspension and a steering gearbox are mounted on the front subframe according to the invention.

FIG. 10 is a perspective view which shows that a front suspension and a steering gearbox are mounted on the front subframe according to the invention.

Figure 11:
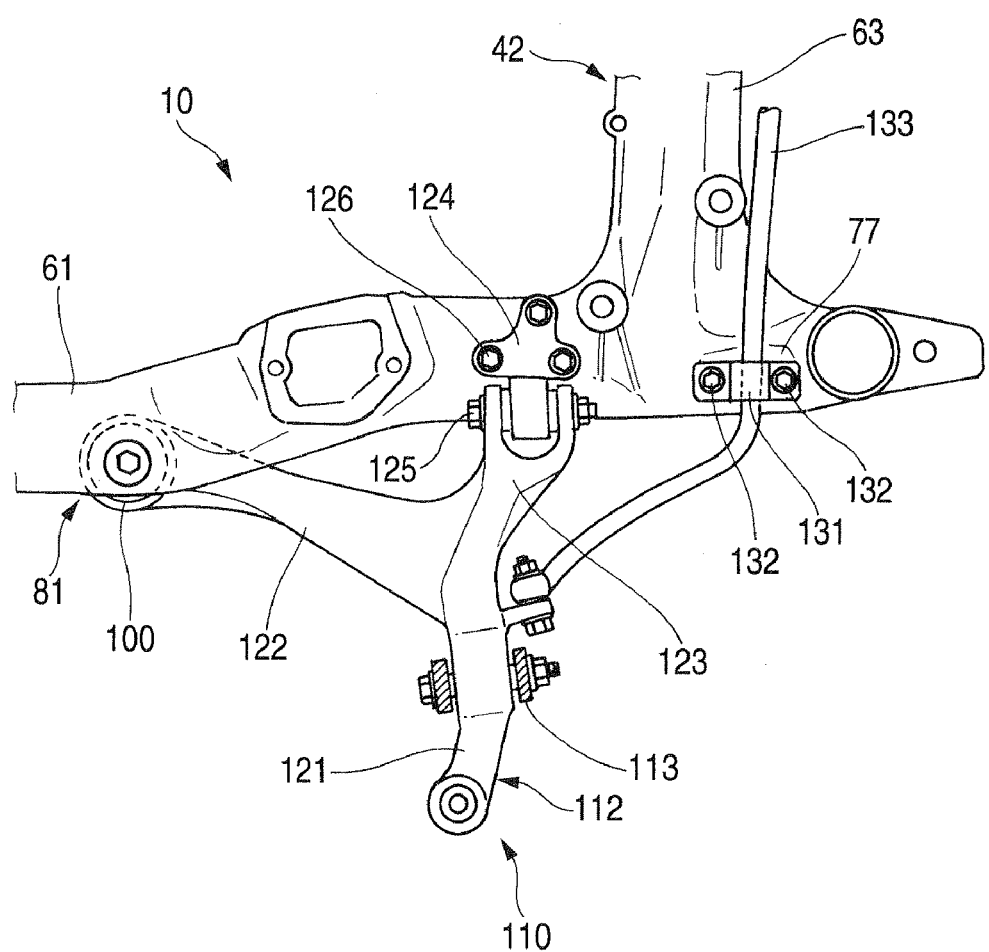
FIG. 11 is a plan view of a main part of the front subframe according to the invention where the front suspension is mounted.

FIG. 11 is a plan view of a main part of the front subframe according to the invention where the front suspension is mounted.

Figure 12:
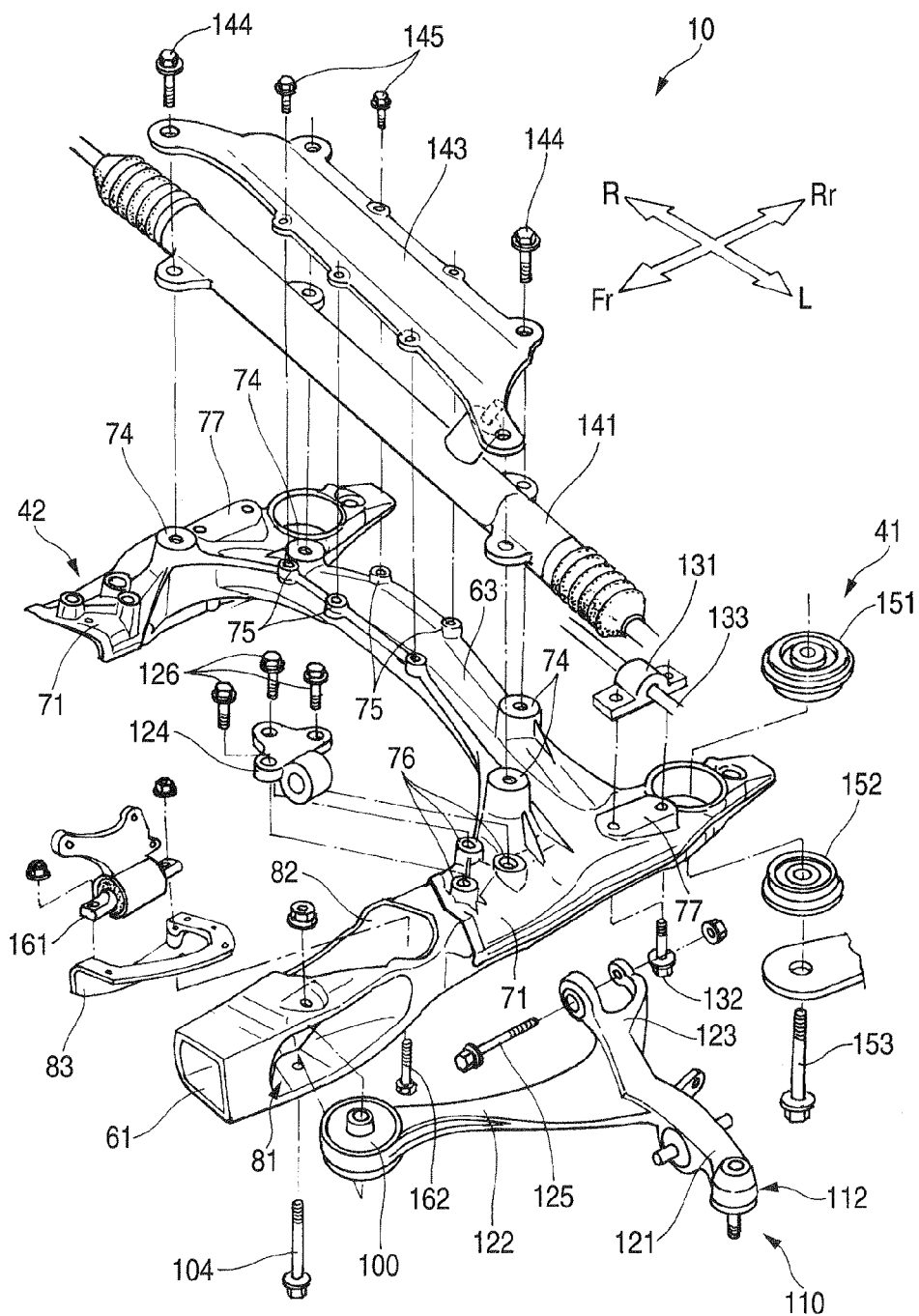
FIG. 12 is an exploded view of the front subframe according to the invention, the front suspension and the steering gearbox.

FIG. 12 is an exploded view of the front subframe according to the invention, the front suspension and the steering gearbox.

As shown in FIG. 10, a left front suspension 110 is a front suspension system which suspends a front road wheel from the body frame 20 and is mainly made up of an upper arm 111 which is mounted on the front side frame 21 in such a manner as to swing vertically, a lower arm 112 which is mounted on the left longitudinal and sub-longitudinal members 61, 71 in such a manner as to swing, a front cushion 113 which is mounted between the lower arm 112 and the front damper housing 23 (refer to FIG. 1) and a knuckle 114 which is connected to the upper arm 111 and the lower arm 112.

As shown in FIGS. 10 to 12, the lower arm 112 is a substantially Y-shaped member as viewed from the top thereof in which a forward-placed front arm 122 and a rearward-placed rear arm 123 are extended from a knuckle connecting portion 121 to which the knuckle 114 is connected. A distal end portion of the front arm 122 is to be mounted in the bracket 81 of the longitudinal member 61 via the elastic bush 100 with a bolt 104 in such a manner as to swing vertically (also refer to FIG. 9(*b*)). On the other hand, a distal end portion of the rear arm 123 is to be mounted on a rear bracket 124 via an elastic bush (not shown) with a bolt 125 in such a manner as to swing vertically. The rear bracket 124 is such as to be mounted on the arm mount portions 76 . . . on the sub-longitudinal member 71 with bolts 126 . . . .

The sub-longitudinal member 71 is such that a stabilizer bracket 131 is mounted on the stabilizer bracket mount portion 77 with bolts 132, 132. The stabilizer bracket 131 is a member which supports a rod-shaped stabilizer 133 which connects between the left and right lower arms 112 (only the left one is shown).

The rear cross member 63 doubles as a member which fixes the steering gearbox 141 which extends in the transverse direction of the body. The steering gearbox 141 is a member which accommodates therein a gear mechanism (for example, a power steering gear mechanism) which converts a steering force of a steering wheel, not shown, into a turning force acting in the transverse direction of the body so as to be drawn out of a tie rod 142. The tie rod 142 is to be connected to an arm 114*a* of the knuckle arm 114.

The steering gearbox 141 and the aluminum diecast cover 143 are superposed on to the rear cross member 63 in that order from thereabove, so that these members are fastened together on to the primary boss portions 74 . . . with bolts 144 . . . , and furthermore, the cover 143 is fastened on to the secondary boss portions 75 with bolts 145 . . . , whereby the steering gearbox 141 can be mounted on the front subframe 42.

The vibration preventive elastic bushes 41 via which the front subframe 42 is mounted on a lower portion of the body frame 20 (refer to FIG. 1) at four corners are each made up of vertically halved elastic bushes 151, 152 and a mounting bolt 153.

The transmission support opening 82 in the left longitudinal member 61 is for mounting a vibration preventive bush 161 on the cover 83 with bolts 162 . . . . This elastic bush 161 is a member for mounting the transmission 44 (refer to FIG. 2) on the front subframe 42.

Figure 13:
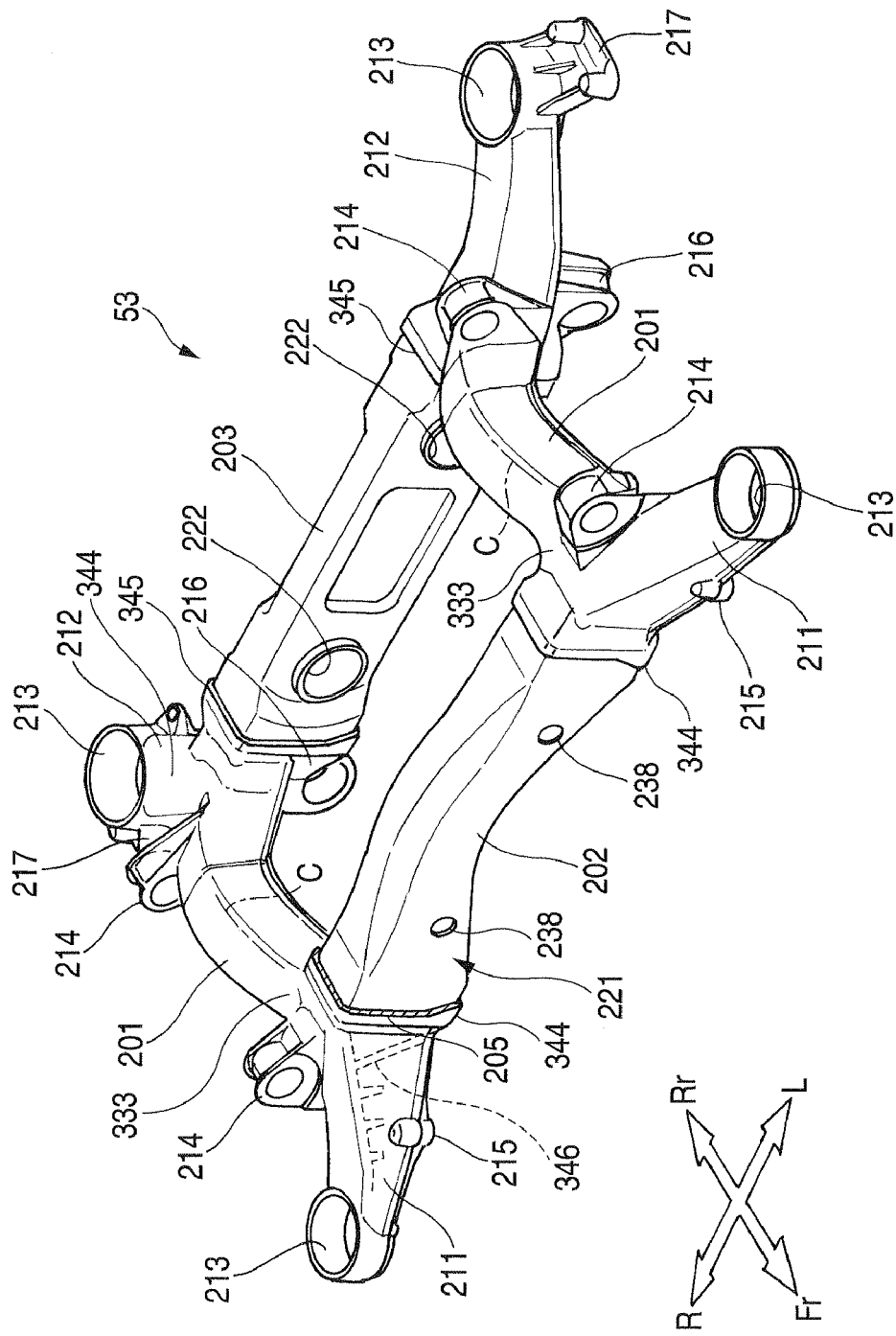
FIG. 13 is a perspective view of a rear subframe according to the invention.
Figure 15:
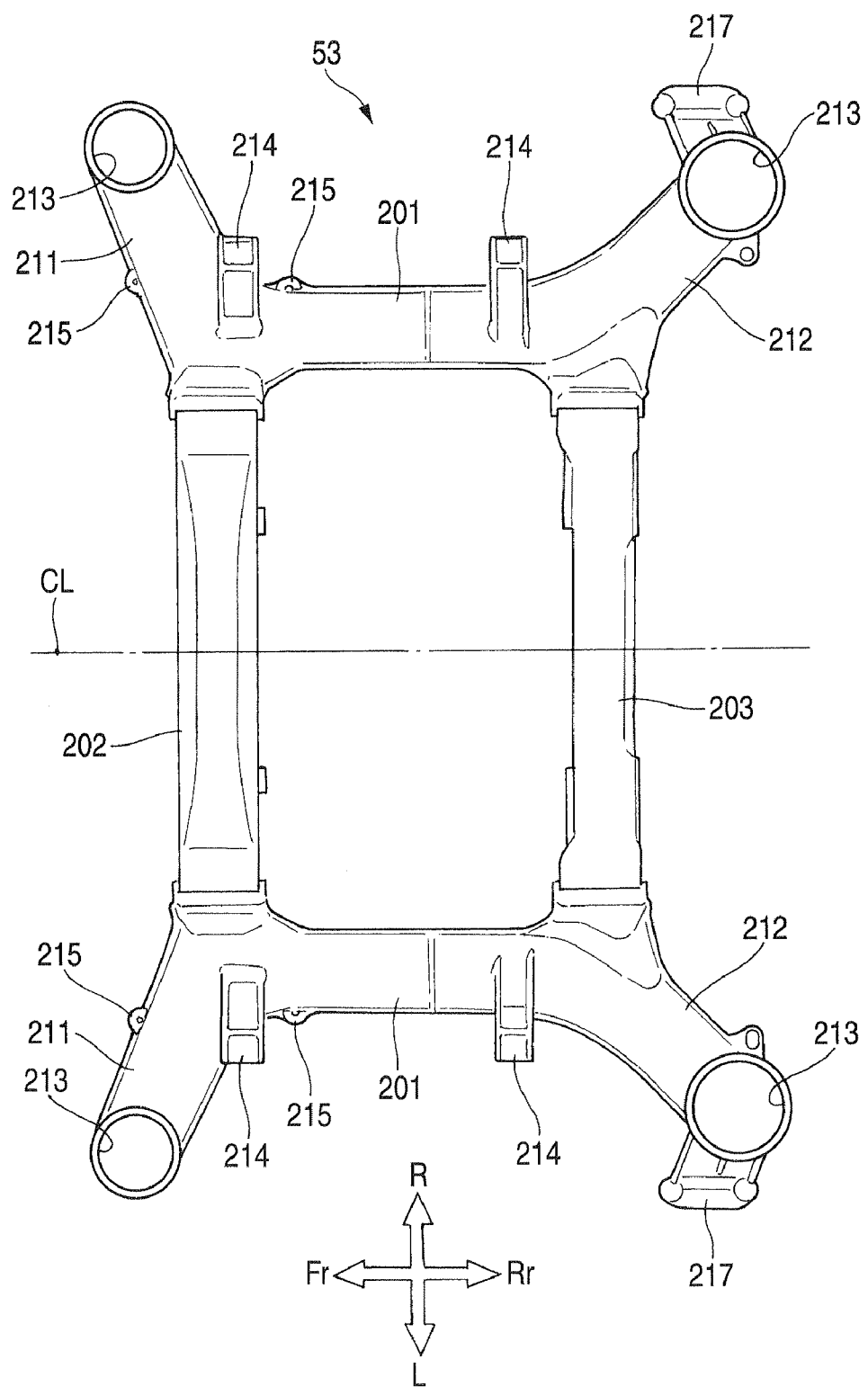
FIG. 15 is a plan view of the rear subframe according to the invention.

Next, an overall configuration of the rear subframe 53 will be described based on FIGS. 13 to 15. FIG. 13 is a perspective view of the rear subframe according to the invention. FIG. 14 is an explanatory diagram which explains materials for respective members which make up the rear subframe according to the invention. FIG. 15 is a plan view of the rear subframe according to the invention.

As shown in FIGS. 13 and 14, the rear subframe 53 is a product of a metallic material such as an aluminum product or an aluminum alloy product (hereinafter, generally referred to as an aluminum alloy product). Among respective members shown in FIG. 14, a material shown white denotes an extruded material (an extruded product) or a protruded material (a protruded product) and a material shown satinized or shaded with dots denotes a diecast product.

As shown in FIGS. 13 to 15, the rear subframe 53 exhibits substantially the shape of projecting parallels (the shape of a sharp) or the shape of a hollowed square as viewed from the top thereof and is made up of left and right longitudinal members 201, 201 which extends in the longitudinal direction of the body, a front cross member 202 which extends in the transverse direction of the body so as to extend between front ends 333, 333 of the left and right longitudinal members 201, 201, a rear cross member 203 which extends in the transverse direction of the body so as to extend between rear ends 334, 334 of the left and right longitudinal members 201, 201. Reference numeral 205 denotes a weld portion (including a bead) which is formed by implementing a fillet welding.

The left and right longitudinal members 201, 201 are side members made up of diecast products whose section intersecting an axis C thereof at right angles is formed into an angular channel shape and each constitute a member which exhibit a transversely outwardly oriented substantially angular channel shape as an overall shape as viewed from the top thereof by forming integrally thereon a front body mount portion 211 which extends transversely outwardly from the front end portion 333 and a rear body mount portion 212 which extends transversely outwardly from the rear end portion 334. The front body mount portion 211 and the rear body mount portion 212 each have a vertically penetrating through hole 213 at a distal end thereof.

The right longitudinal member 201, which is configured as described above, has integrally front upper and rear upper upper-side brackets 214, 214 which are formed at upper portions of the front end portion 333 and the rear end portion 334 and on which an upper arm 261 (refer to FIG. 20) of a suspension arm is to be mounted, a suspension bracket mount portion 215 which is formed at a lower portion of the front end portion 333, a rear upper lower rear bracket 216 which is formed at a lower portion of the rear end portion 334 an on which a rear lower arm (not shown) of the suspension arm is to be mounted, and a stabilizer bracket mount portion 217. In addition, the right longitudinal member 201 has a separate bracket 292 constituting a separate mount portion which is mounted on the suspension bracket mount portion 215 and which has a front upper lower-side bracket 262 (refer to FIG. 20) on which a lower arm 262 is to be mounted, affront connecting portion 344 formed on the front end portion 333, a rear connecting portion 345 formed on the rear end portion 334, and a partition side piece 346 formed at a deep portion in the front connecting portion 344.

The left longitudinal member 201 is similar to the right longitudinal member 201, and hence, the description thereof will be omitted.

The front and rear cross members 202, 203 are cross members of molded products formed by obtaining a square pipe from, for example, a tubular extruded material (an extruded product) or a similar protruded material (a protruded product) and further applying a bulging process to the square pipe so obtained so as to form it into a partially irregular shape (corresponding to recessed portions 221, 221). The front cross member 202 is, as shown in FIG. 16, such that a curved portion 248 is formed at a center thereof which is curved in such a manner as to be convex or protrude upwardly in order to avoid the interference with the rear differential gearbox 54 (refer to FIG. 3). In addition, the front cross member 202 is such that recessed portions 221, 221 are formed in such a manner as to continue from the center to the left and right thereof and distal end portions 249, 249 are formed to continue from the recessed portions 221, 221, so as to be fitted in the front connecting portions 344, 344 with slightly smaller dimensions than internal dimensions of the front connecting portions 344, 344. The rear cross member 203 has a pair of left and right mount through holes 222, 222.

Both ends of the front and rear cross members 202, 203 are inserted into the left and right longitudinal members 201, 201 so as to be joined integrally thereto.

Next, the bracket (recessed portion) 221 provided in the front cross member 202 will be described based on FIGS. 16 to 18.

FIGS. 16(*a*) to (*e*) are diagrams which show the configuration of the front cross member according to the invention, in which FIG. 16(*a*) shows a configuration resulting when the front cross member 202 is viewed from the front thereof, FIG. 16(b) shows a configuration resulting when the front cross member 202 is viewed from front and below, FIG. 16(c) shows a configuration of the front cross member 202 which results when taken along the line c-c in FIG. 16(a), FIG. 16(d) shows a configuration of the front cross member 202 which results when taken along the line d-d in FIG. 16(a), and FIG. 16(e) shows a configuration of the front cross member 202 which results when taken along the line e-e in FIG. 16(a).

Figure 17A:
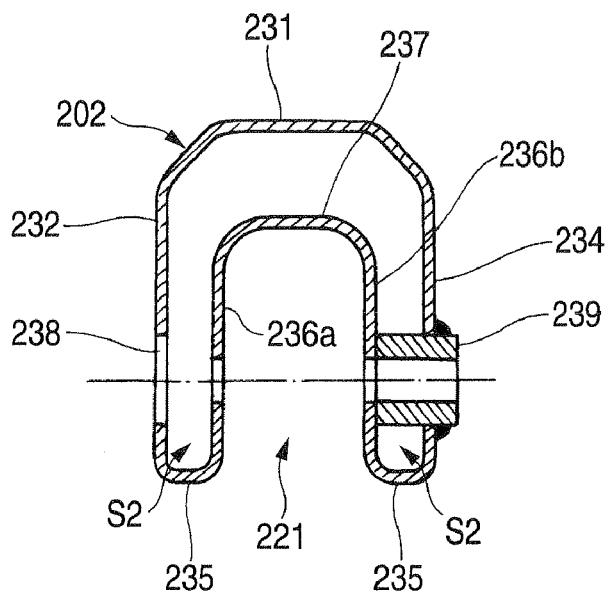
FIGS. 17(a) to (b) are diagrams which shows the configuration of the front cross member.
Figure 17B:
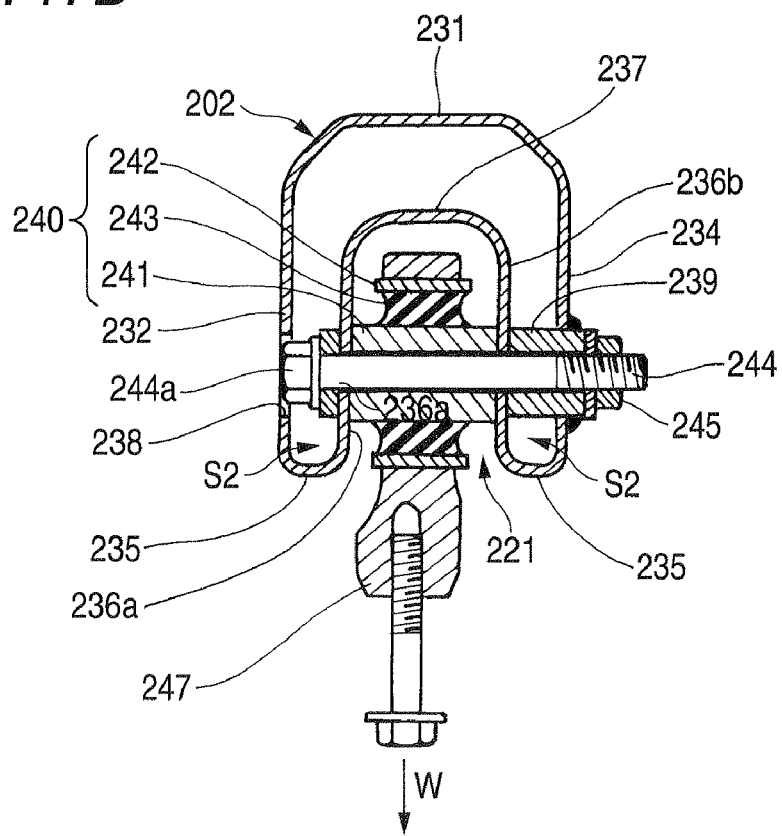

FIGS. 17(a), (b) are diagrams which show the configuration of the front cross member according to the invention, in which FIG. 17(a) shows the configuration of a section of the front cross member 202 which results when taken along the line d-d in FIG. 16(a), and FIG. 17(b) shows a bush mounting structure in which an elastic bush 240 is mounted in a portion whose section is shown in FIG. 17(a).

Figure 18:
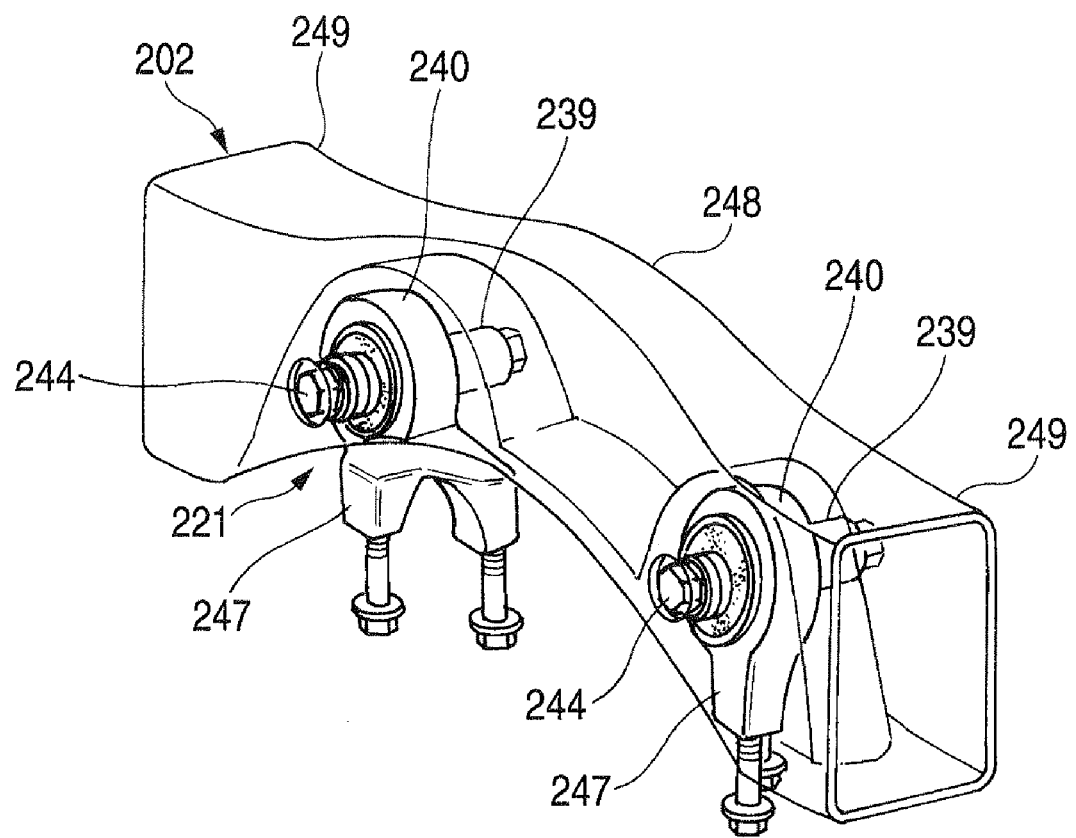
FIG. 18 is a perspective view showing a configuration in which an elastic bush is mounted on the front cross member according to the invention.

FIG. 18 is a perspective view which shows a configuration in which the elastic bushes are mounted in the front cross member according to the invention.

As shown in FIGS. 16 and 17(a), the front cross member 202 is a frame which is made up of a tubular member, and this tubular member is a member which is formed to have a substantially quadrangular closed section by an upper plate 231, a front side plate 232, a lower plate 233 and a rear side plate 234. The front side plate 232 corresponds to a front surface of the rear subframe 53 shown in FIG. 13. The lower side plate 233 is parallel to the upper plate 231, and the rear side plate 234 is parallel to the front side plate 232.

The front cross member 202, which is configured as described above, is such that the shape of a section which lies normal to an axis thereof is recessed towards an inside (in a direction indicated by arrows a1, a1) of the section at an intermediate position along the length thereof, so that resulting recessed portions 221, 221 constitute brackets. The recessed portions 221, 221 are elongated narrow recesses which generally extend along an arch-like shape of the front cross member 202.

To be specific, the recessed portion 221 is configured so as to exhibit a rectangular section by recessing the lower plate 233 in such a manner as to be folded back from an edge of the front side plate 232 and an edge of the rear side plate 234 into the inside of the closed section, so that portions of the lower plate 233 so folded back extend inwards along the front and rear side plates 232, 234 via resulting upper and lower folded-back portions 235, 235 so as to constitute front and rear bracket plate portions 236a, 236b while a portion between ends of the portions of the lower plate 233 so extended constitutes the bottom 237.

As shown in FIG. 17(a), the front bracket plate portion 236a is situated at a position which is spaced apart by a given dimension from the front side plate 232, and the rear bracket plate portion 236b is situated at a position which is spaced apart by a given dimension from the rear side plate 234. The front and rear side plates 232, 234 and the front and rear bracket plate portions 236a, 236b are flat plates which are parallel to each other. Due to this, there are provided given space portions S2, S2 within the folded-back portions 235, 235. Consequently, the folded-back portions 235, 235 can be said to be portions which are formed so as to continue from the front cross member 202 which is the tubular member. In addition, the folded-back portions 235, 235 and the bracket plate portions 236a, 236b are made to oppositely face each other via the given space portions S2, S2, respectively. The bottom 237 is situated at a position which is spaced apart at a given interval from the upper plate 231.

Thus, the front and rear bracket plate portions 236a, 236b can be formed on inner surfaces of the recessed portion 221.

As is clear from what has been described heretofore, the recessed portion 221, functioning as the bracket, has the bracket plate portions 236a, 236b and the folded-back portions 235, 235 which are folded back from the bracket portions 236a, 236b. Thus, the bracket 221 is characterized by being provided integrally in the front cross member 202 which is made up of the tubular frame at the intermediate position along the length thereof.

Furthermore, as shown in FIG. 16, the bracket 221 has a pair of left and right bolt through holes 238, 238 which penetrate horizontally. These bolt through holes 238, 238 are such as to pass through the front and rear side plates 232, 234 and the front and rear bracket plate portions 236a, 236b and are situated at positions which are symmetrical with each other with respect to the transverse center line CL.

As shown in FIG. 17(a), among the bolt through holes 238, a hole diameter of the hole portions provided in the front and rear side plates 232, 234 are larger than a hole diameter of the hole portions provided in the bracket plate portions 236a, 236b.

The bracket 221 is such that a tubular collar 239 is inserted thereinto from the hole portion in the rear side plate 234 at a position where the bolt through hole 238 is provided, and a distal end of the collar 239 which leads the insertion is brought into abutment with a plate surface of the rear bracket plate portion 236b, whereby the collar 239 is joined to the bracket 221 from the hole portion in the rear side plate 234 by virtue of welding or the like. On the other hand, since the hole portion in the front side plate 232 is larger, a head portion of a bolt can be put in and out of the hole portion, and a tool can be hooked thereon.

FIGS. 17(b) and 18 show the bush mounting structure in which a pair of left and right elastic bushes (damping members) 240 are mounted on the front cross member 202 by the brackets 221. The elastic bush 240 is a vibration preventive member which is configured such that an inner tube 241 and an outer tube 242 which surrounds the inner tube 241 are connected together by means of an elastic element 243 such as a rubber or the like, and an arm member such as a suspension arm 247 which suspends, for example, the rear differential gearbox 54 (refer to FIG. 3) is integrally provided on the outer tube 242.

The bracket 221 is characterized by being disposed in such a manner that ends of the inner tube 241 are held by the bracket plate portions 236a, 236b and being mounted by a bolt 244 which is passed through the inner tube 241 and the bolt through hole 238. The front and rear bracket plate portions 236a, 236b have planes which are brought into contact with respective end faces of the inner tube 241.

The bracket 221 constitutes a location where a load W is exerted directly on the front and rear bracket plate portions 236a, 236b via the bolt 244 when the inner tube 241 is fitted between the front bracket plate 236a which is parallel to the front side plate 232 and the rear bracket plate portion 236b which is parallel to the rear side plate 234 with the load W exerted on the elastic bush 240. Consequently, the load is transmitted to the recessed portion 221 via the elastic bush 240 so as to be borne by the recessed portion 221, and as a result, the strength of the cross member (the front cross member) 202 can be increased. Note that the load W is also transmitted directly to the rear side plate 234. On the other hand, while the construction allows the load W to be transmitted to the front side plate 232 via the lower plate 55, it is possible that the front side plate 232 is given a similar construction to that of the rear side plate 234.

In FIG. 17(b), a mounting procedure of the elastic bush 240 will be described. Firstly, the elastic bush 240 is inserted into the recessed portion 221 or the bracket 221 from therebelow, and following this, the bolt 244 is inserted into the bolt through hole 238 from the front side plate 232 side so as to be passed through the inner tube 241 and the collar 239, a nut 245 being tightened thereon.

Thus, the elastic bush 240 can be mounted on the front cross member 202 by holding both the ends of the inner tube 241 by the bolt 244 and the nut 245 via the bracket plate portions 236a, 236b and the collar 239. Since the front bracket plate portion 236a is spaced apart by the given dimension from the front side plate 232, the head portion 244a of the bolt 244 protrudes outwardly from the front side plate 232 in no case.

In addition, since the collar 239 which is joined to the rear side plate 234 is brought into abutment with the plate surface of the rear bracket plate portion 236b and is fastened together with the ends of the inner tube 241 by the bolt 244, the support rigidity of the front cross member 202 can be increased.

As is clear from what has been described above, according to the vehicle subframe (the rear subframe) shown in FIGS. 16 to 18, since the front cross member 202 of the rear subframe 53 has the recessed portions 221 which are recessed continuously over a longitudinal direction of a cross member main body 52, the strength of the cross member (the front cross member) 202 can be increased by the recess of the recessed portion 221.

Since the recessed portion 221 has the front bracket plate portion 236a which is parallel to the front side plate 232 and the rear bracket plate portion 236b which is parallel to the rear side plate 234, the strength (section modulus) against the load W is increased by the front and rear bracket plate portions 236a, 236b, thereby making it possible to increase the strength.

Since the recessed portion 221 is formed at a lower portion of the cross member main body 52 and is recessed upwardly (in a direction indicated by an arrow al in FIG. 16(b)) and the elastic bush 240 (refer to FIG. 18) is fitted in the resulting recess, the load is transmitted to the recessed portion 221 via the elastic bush 240 (refer to FIG. 17(b)) so as to be borne by the recessed portion 221, and as a result, the strength of the front cross member 202 can be increased.

In addition, according to the bush mounting structure shown in FIGS. 16 to 18, notwithstanding the simple configuration in which only the planes which are brought into contact with the end faces of the inner tube 241 of the elastic bush 240 are provided on the bracket plate portions 236a, 236b and the folded-back portions 235, 235 are provided by folding back the edges of the bracket plate portions 236a, 236b, the rigidity of the bracket plate portions 236a, 2136b can further be increased by the folded-back portions 235, 235. Due to this, the mount strength and support rigidity of the bracket 221 on which the elastic bush 240 is mounted can be increased. Consequently, the load exerted on the bracket plate portions 236a, 236b from the elastic bush 240 can sufficiently borne by the bracket 221 and the load can be transmitted to the front cross member 202, functioning as the frame, with good efficiency.

Furthermore, since the bracket plate portions 236a, 236b and the folded-back portions 235, 235 are made to oppositely face each other via the given space portions S2, S2, the rigidity of the composite component made up of the bracket plate portions 236a, 236b and the folded-back portions 235, 235 can be increased by such an extent. Thus, the rigidity of the bracket plate portions 236a, 236b and the folded-back portions 235, 235 can further be increased.

Additionally, since the bracket plate portions 236a, 236b are formed on the inner surfaces of the recessed portion 221 by recessing the part of the front cross member (frame) 202 which is made up of the tubular member towards the inside of the section thereof, the bracket 221 can integrally be formed on the front cross member 202 which is made up of the tubular member with the simple configuration. Due to this, there is no need to mount a bracket made up of a separate member on the front cross member 202. Since the number of components can be reduced, the lightening of the weight of the composite component made up of the front cross member 202 and the brackets 221 can be realized, and the reduction in production costs of the bush mounting structure can be realized. Furthermore, since there is no need to join a bracket made up of a separate member to the front cross member 202, the accuracy with which the composite component made up of the front cross member 202 and the brackets 221 is manufactured can be increased. Moreover, the load exerted on the bracket plate portions 236a, 236b from the elastic bush 240 can be transmitted to the front cross member 202 with good efficiency.

Furthermore, since the folded-back portions 235, 235 which are folded back from the bracket plate portions 236a, 236b are formed to continue from the front cross member 202 which is made up of the tubular member, the load exerted on the bracket plate portions 236a, 236b from the elastic bush 240 can be borne by the entirety of the front cross member 202 via the folded-back portions 235, 235 in an ensured fashion. The support rigidity of the bracket 221 which supports the elastic bush 240 can be increased with better efficiency.

Figure 19A:
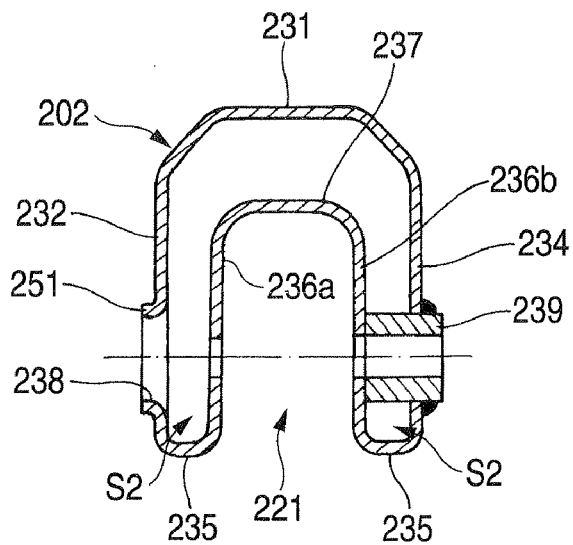
FIGS. 19(a) to (c) are diagrams which show modified examples of front cross members according to the invention.
Figure 19B:
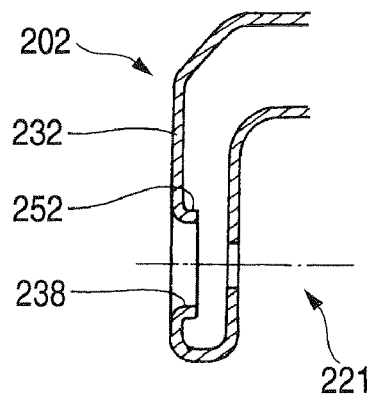
Figure 19C:
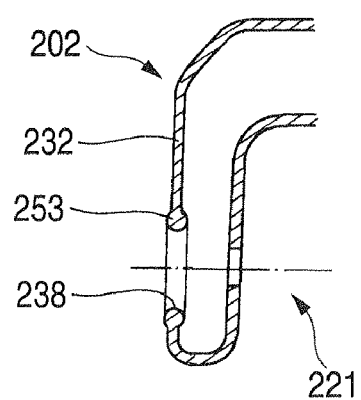

FIGS. 19(a) to (c) are diagrams which show modified examples of front cross members according to the invention, the diagrams being made to show them in such a manner as to correspond to FIG. 17(a), and modified examples of portions where bolt through holes 238 are provided are shown therein.

A modified example shown in FIG. 19(a) has an outwardly protruding annular collar portion 251 around an edge of a bolt through hole 238 which is opened in a front side plate 232. A modified example shown in FIG. 19(b) has an inwardly protruding annular collar portion 252 around an edge of a bolt through hole 238 which is opened in a front side plate 232. A modified example shown in FIG. 19(c) has a annular edge portion 253 around an edge of a bolt through hole 239 which is opened in a front side plate 232 which is thicker than the thickness of the front side plate 232.

Thus, by providing the collar portions 251, 252 and the annular edge portion 253 by applying a burring or the like to the edges of the bolt through holes 238 opened in the front and rear front side plate 232 and bracket plate portions 236a, 236b, the strength around the holes can be increased so as to alleviate the stress concentration.

Next, the configuration of surroundings of the rear side frame 53 and the rear suspension 260 will be described based on FIG. 20. Note that since the left and right rear suspensions 260, 260 are similar in configuration to each other, only the left-hand rear suspension will be described, the description of the right-hand one being omitted.

Figure 20:
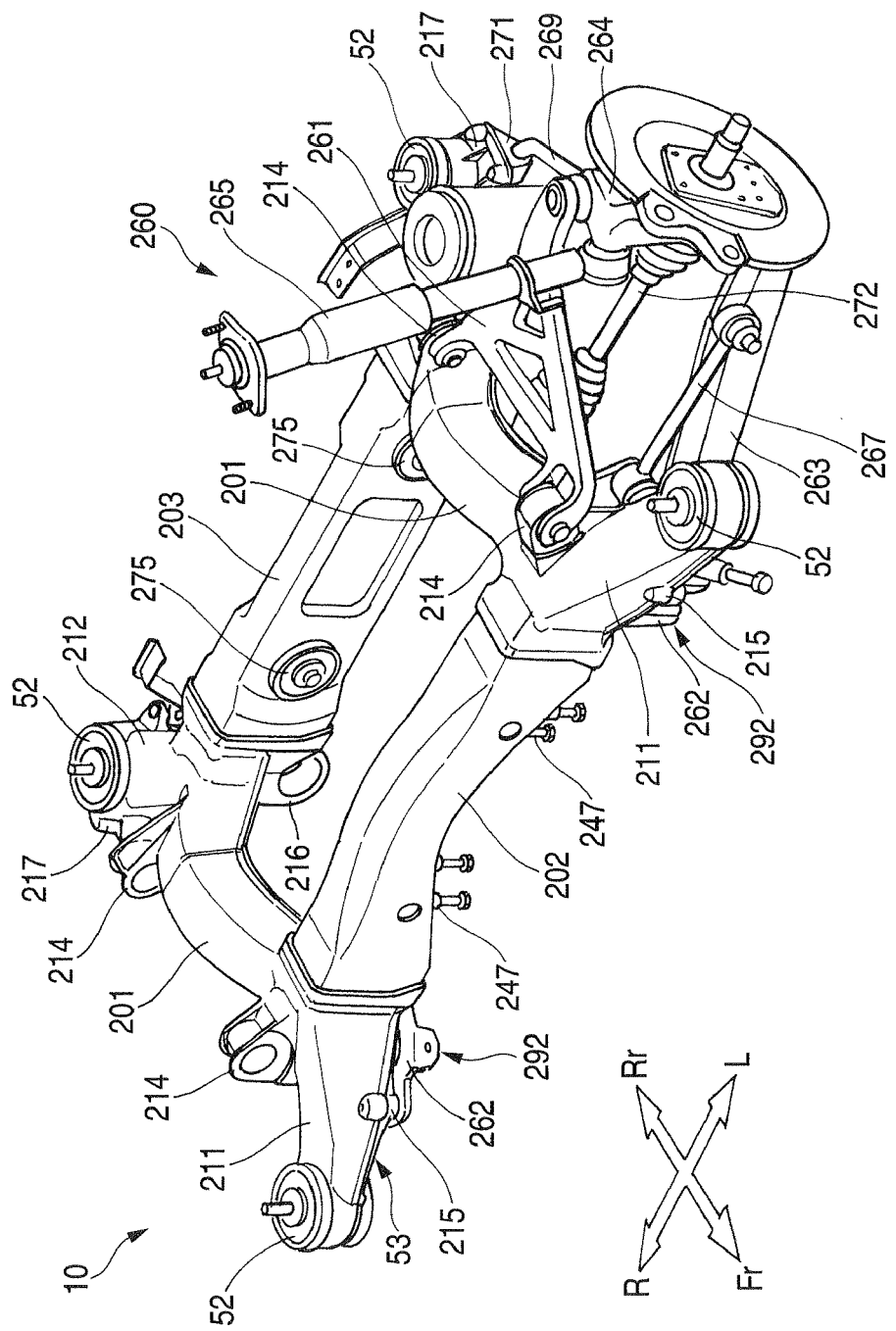
FIG. 20 is a perspective view which shows that a rear suspension is mounted on the rear subframe according to the invention.
Figure 21B:
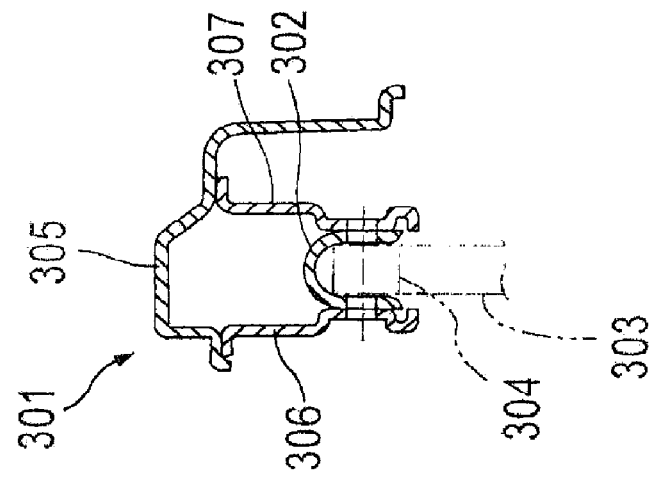
FIGS. 21(a) to (b) are schematic diagrams which shows a conventional bush mounting structure.
Figure 21A:
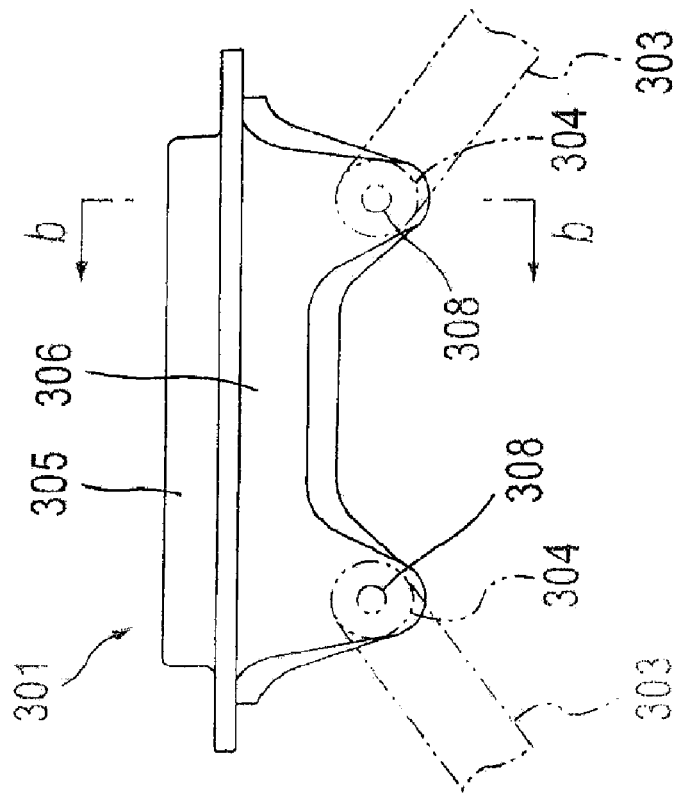
Figure 22A:
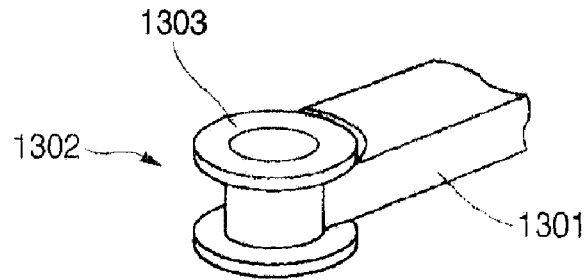
FIGS. 22(a) to (c) are diagrams which explain a basic configuration of a conventional vehicle subframe.
Figure 22B:
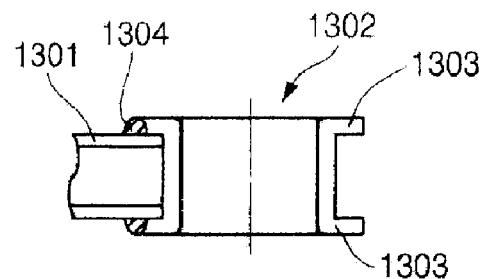
Figure 22C:
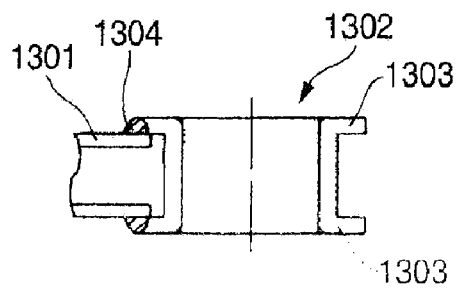

FIG. 20 is a perspective view which shows that the rear suspension is mounted on the rear subframe according to the invention. The left rear suspension 260 is a suspension system which suspends a rear road wheel from the rear subframe 53 and is mainly made up of an upper arm 261 which is mounted on the upper-side brackets 214, 214 in such a manner as to swing vertically, a front lower arm 263 which is mounted on the suspension bracket mount portions 215 . . . by the lower front bracket 262 in such a manner as to swing vertically, a rear lower arm (not shown) which is mounted on the lower rear bracket 216 (refer to FIG. 13) in such a manner as to swing vertically, a knuckle 264 connected to the upper arm 216 and the front and rear lower arms 263, a rear cushion 265 which is mounted between the knuckle 264 and a rear damper housing, not shown, a trailing arm 267 which connects a front portion of the knuckle 264 to the lower front bracket 262 and a rod-shaped stabilizer 269 which connects between left and right rear lower arms.

The stabilizer 269 is to be mounted on the stabilizer bracket mount portion 217 of the rear subframe 53 by the stabilizer bracket 271.

In the figure, reference numeral 272 denotes a drive shaft for the rear road wheel. Reference numerals 275, 275 denote vibration preventive elastic bushes via which the rear differential gearbox 54 is mounted.

Note that in the embodiment of the invention, the frames on which the elastic bushes 100, 240 are to be mounted are not limited to the front subframe 42 and the rear subframe 53, and hence, the embodiment of the invention can be applied to various types of frames, and the embodiment may be applied to, for example, to the body frame 20.

In addition, the tubular member which makes up the frame is not limited to tubes having square or substantially quadrangular shape, and hence, a tube of, for example, a round section may be used.

Additionally, the materials, shapes and dimensions of the frames and brackets are arbitrary.

In addition, members that are mounted on the frame by the bracket via the elastic bush 100, 240 is not limited to the constituent member of the suspension and the rear differential gearbox 54 but may be arbitrary.

Additionally, while the vehicle subframe of the invention is described as being applied to the four-wheel vehicle in the embodiment, the vehicle subframe of the invention can be applied to a three-wheel vehicle, and there will be caused no problem when applied to general vehicles.

While the invention has been described in detail with reference to the specific embodiment, it is obvious to those skilled in the art that various changes and modifications can be applied thereto without departing from the spirit and scope of the invention.

The subject patent application is based on the Japanese Patent Application (No. 2004-102969) filed on Mar. 31, 2004 and the Japanese Patent Application (No. 2004-102133) filed on Mar. 31, 2004, and the contents thereof are incorporated herein by reference.

INDUSTRIAL APPLICABILITY

The vehicle subframe of the invention is preferred for four-wheel vehicles.

In addition, the bush mounting structure of the invention is preferred for vehicles such as motor vehicles in which constituent members of suspension systems and power transmission systems are mounted on a frame.

The invention claimed is:

1. A bush mounting structure for mounting on a frame by a bracket an elastic bush in which an inner tube and an outer tube which surrounds the inner tube are connected together by an elastic body, wherein the bracket is disposed in such a manner as to hold both ends of the inner tube therein, and the elastic bush is mounted by passing a bolt through the inner tube, wherein;

the frame includes an upper plate, a lower plate, and a side plate, and defines a substantially quandrangular closed section, wherein the frame is a tubular member and portions of the side plate are folded-back into the closed section;

the bracket forms a recessed portion in the closed section;

the folded-back portions are continuously formed by the side plate, and extend along the upper and lower plates to form upper and lower bracket plate portions, respectively; and a space portion is formed in each folded-back portion.

2. A bush mounting structure as set forth in claim 1, wherein opposing edges of the upper and lower bracket plate portions define a bottom having a through hole formed therein.

3. A bush mounting structure as set forth in claim 2, wherein end portions of the opposing edges are curved and support the inner tube.

4. A bush mounting structure as set forth in claim 1, wherein the recessed portion is continuously formed by the folded-back portions.

5. A bush mounting structure as forth in claim 2, wherein the bottom is a flat plate arranged substantially parallel to and spaced apart from the side plate a predetermined distance.

* * * * *